United States Patent [19]

Okazaki

[11] Patent Number: 5,504,619
[45] Date of Patent: Apr. 2, 1996

[54] SCANNING DRUM INNER FACE AND METHOD OF SCANNING THEREFOR

[75] Inventor: Masahide Okazaki, Kyoto, Japan

[73] Assignee: Dainippon Screen Mfg. Co., Ltd., Kyoto, Japan

[21] Appl. No.: 353,953

[22] Filed: Dec. 12, 1994

Related U.S. Application Data

[63] Continuation of Ser. No. 780,355, Oct. 22, 1991, abandoned.

[30] Foreign Application Priority Data

| Oct. 31, 1990 | [JP] | Japan | 2-296690 |
| Nov. 26, 1990 | [JP] | Japan | 2-324001 |
| Aug. 29, 1991 | [JP] | Japan | 3-244633 |

[51] Int. Cl.$^6$ ............................. G02B 5/30; G02B 27/28
[52] U.S. Cl. ............................. 359/495; 359/497
[58] Field of Search .................... 359/298, 487, 359/494, 495, 497, 498, 499, 629; 358/491, 493

[56] References Cited

U.S. PATENT DOCUMENTS

| 3,497,283 | 2/1970 | Law | 359/634 |
| 3,508,809 | 4/1970 | Wilder et al. | 359/495 |
| 3,677,621 | 7/1972 | Smith | 359/495 |
| 3,704,061 | 11/1972 | Travis | 359/629 |
| 3,767,290 | 10/1973 | Lang et al. | 359/634 |
| 3,774,986 | 11/1973 | Bourgoin et al. | 359/497 |
| 3,785,714 | 1/1974 | Hock et al. | 359/495 |
| 3,816,659 | 6/1974 | Landsman | 178/7.6 |
| 4,131,916 | 12/1978 | Landsman | 358/285 |
| 4,475,787 | 10/1984 | Starkweather | 350/6.4 |
| 4,521,082 | 6/1985 | Suzuki et al. | 359/499 |
| 4,533,813 | 8/1985 | Rayburn et al. | 359/497 |
| 4,606,601 | 8/1986 | Starkweather | 350/6.4 |
| 4,800,556 | 1/1989 | Charlier et al. | 359/629 |

FOREIGN PATENT DOCUMENTS

| 0264341 | 4/1988 | European Pat. Off. . | |
| 0299455 | 1/1989 | European Pat. Off. . | |
| 0130316 | 8/1983 | Japan | 359/495 |
| 60-151610 | 8/1985 | Japan . | |
| 0136618 | 6/1987 | Japan | 359/494 |
| 1155371 | 6/1989 | Japan . | |
| 59119314 | 7/1989 | Japan . | |
| 2-124514 | 5/1990 | Japan . | |
| 1332304 | 10/1973 | United Kingdom | 359/498 |

OTHER PUBLICATIONS

Optics and Laser Technology vol. 18, No. 4, Aug. 1986, Guilford, Surrey, Great Britain; pp. 213–215; D. W. Swift "Rotation Prisms in Series" p. 214, Col. 1, line 30—Column 2, line 31; FIG. 2.

*Primary Examiner*—Ricky D. Shafer
*Attorney, Agent, or Firm*—Brumbaugh, Graves, Donohue & Raymond

[57] ABSTRACT

The present invention allows image recording with plural light beams while eliminating alignment changes of light spots on the inner face of a drum. A light beam output unit 212 combines two circularly polarized light beams having opposite handedness to each other to produce a composite light beam CB. A polarization beam splitter 203 and mirrors 205 and 207 change the course of the light beam towards the inner face of a drum 120. A quarter-wave plate 202 and the polarization beam splitter 203 splits the composite light beam to two separate light beams as a function of the handedness of the circularly polarized light. The optical elements 202, 203, 205, and 207 are integrally rotated around the axis of the drum 120 by a main scanning motor 230, thus scanning a photosensitive material 110 held on the inner face of the drum 120 with the light beams.

7 Claims, 20 Drawing Sheets s-POLARIZED LIGHT   p-POLARIZED LIGHT

SCANNING DRUM INNER FACE AND METHOD OF SCANNING THEREFOR

This application is a continuation of application Ser. No. 07/780,355, filed on Oct. 22, 1991, now abandoned.

BACKGROUND OF THE INVENTION

1. Field of the Invention

The present invention relates to an optical apparatus for scanning an inner face of a drum, and more particularly to an image recording apparatus of a drum-inner-face scanning type for recording an image on a recording medium such as a photosensitive film held on the inner face of a drum. The present invention also relates to a method of scanning an inner face of a drum and a light deflector applicable to the apparatus.

2. Description of Related Art

Drum type image recording scanners include two types concerning where to mount a photosensitive film: the first type holds a photosensitive film on the outer face of the drum on which light beams scan to record an image, and the second type on the inner face of the drum.

In the first type, or the drum-outer-face scanning type, a recording head for emitting light beams is disposed outside the drum and the main scanning is performed by rotation of the drum. The drum-outer-face scanning type has an advantage of the ease with which plural light beams can be used for scanning. However, this first type has disadvantages of the relatively large size because of the recording head disposed outside the drum and of the need for relatively large power to rotate the drum.

In the second type, or the drum-inner-face scanning type, a recording head is disposed inside the drum and the main scanning can be performed by rotation of the recording head. An example of the drum-inner-face scanning type is disclosed in U.S. Pat. No. 4,853,709. The drum-inner-face scanning type has advantages of the relatively small size and of less need for power to rotate the recording head.

Multibeam scanning is preferable in order to increase the recording speed. However, the drum-inner-face scanning type has the following problem in multibeam scanning and has not been so much used accordingly. FIG. 1 schematically illustrates the problem when the plural beams were used in the drum-inner-face scanning type. Plural light beams A2, A3 and A4 go along the axis of a drum A5, and are reflected at a mirror A1 to be incident on the inner face of the drum A5. The mirror A1 rotates to perform the scanning of the inner face of the drum by the plural beams. Disposition of the light beam spots on the inner face of the drum A5 are varied with the rotational position of the mirror A1, and eventually, the order of the plural light beams is inverted, for example, from (A2, A3, A4) to (A4, A3, A2) at opposite sides of the drum. Scanning lines of the plural light beams thus cross one another on the photosensitive film on the inner face of the drum, and this makes the multibeam scanning impossible in the image recording apparatus of the drum-inner-face scanning type.

The same problem is observed when a pentagonal prism is used, as in the U.S. Pat. No. 4,853,709, in place of the mirror A1.

SUMMARY OF THE INVENTION

An object of the invention is to eliminate the disposition change of plural beam spots on the inner face of a drum.

Another object of the invention is to provide a light reflector applicable to the image recording apparatus of the drum-inner-face scanning type.

The present invention is directed to an optical apparatus for scanning an inner face of a cylindrical member with a light beam. The apparatus comprises the following elements:

composite light beam generation means for generating a composite light beam including two circularly polarized light components which have opposite handedness to each other and whose principal rays coincide with each other;

splitting means for converting the two circularly polarized light components to two linearly polarized light components of cross polarization, splitting the two linearly polarized light components to make a predetermined angle to thereby produce two scanning beams, and deflecting the two scanning beams towards the inner face of the cylindrical member; and rotating means for rotating the splitting means around the axis of the cylindrical member to thereby scan the inner face of the cylindrical member with the two scanning beams.

According to an aspect of the present invention, the splitting means comprises the following elements:

a wave plate for converting the two circularly polarized light components to first and second linearly polarized light of first and second polarization directions perpendicular to each other;

a polarization beam splitter for selectively transmits linearly polarized light of the first polarization direction and deflects linearly polarized light of the second polarization direction;

a first quarter-wave plate and a first reflector disposed in this order after the polarization beam splitter such that the first linearly polarized light passes through the first quarter-wave plate to be reflected by the first reflector, and passes through the first quarter-wave plate again, thereby re-entering the polarization beam splitter as linearly polarized light of the second polarization direction to be deflected by the polarization beam splitter; and a second quarter-wave plate and a second reflector disposed in this order after the polarization beam splitter such that the second linearly polarized light passes through the second quarter-wave plate to be reflected by the second reflector, and passes through the second quarter-wave plate again, thereby reentering the polarization beam splitter as linearly polarized light of the first polarization direction to pass through the polarization beam splitter.

According to another aspect of the present invention, at least one of the first and second reflectors is inclined to have a non-zero reflection angle.

According to still another aspect of the present invention, the splitting means comprises the following elements:

a reflector inclined to a plane perpendicular to an optical path of the composite light beam;

a quarter-wave plate for converting the two circularly polarized light components of the composite light beam to the two linearly polarized light components of cross polarization; and a polarization beam splitter, disposed after the quarter-wave plate, for splitting the two circularly polarized light components.

Preferably, the polarization beam splitter and the reflector are disposed such that the reflector deflects the two linearly polarized light components split by the polarization beam splitter towards the inner face of the cylindrical member.

Alternatively, the polarization beam splitter and the reflector are disposed such that the polarization beam splitter splits the two light components of the composite light beam deflected by the reflector towards the inner face of the cylindrical member.

According to the preferred embodiments, orientation of the polarization beam splitter is adjustable around the principal ray of the composite light beam incident on the polarization beam splitter.

Preferably, the reflector has a plane of reflection covered with a dielectric multi-layered film.

According to another aspect of the present invention, the splitting means comprises reflecting means having two reflecting planes facing each other at a predetermined angle for successively reflecting an incident light beam.

According to the preferred embodiments, the reflecting means comprises a pentagonal prism.

According to still another aspect of the present invention, the composite light beam generation means comprises: a multi-color light source for emitting a plurality of light beams of different wavelengths; and a prism for splitting the plurality of light beams.

Alternatively, the composite light beam generation means comprises: light source means for emitting two light beams of cross polarization; a modulator for on-off controlling the two light beams in response to given modulation signals corresponding to the two light beams, respectively; and combining means for combining the modulated two light beams to produce the composite light beam.

According to the preferred embodiments, the light source means comprises: a light source for emitting one light beam; and beam splitting means for splitting the one light beam to the two light beams.

The present invention is also directed to a light deflector for deflecting a given circularly polarized light beam. The light deflector comprises the following elements:

optical means for emitting at least a linearly polarized light component of a first polarization direction from the given circularly polarized light beam; and a first quarter-wave plate and a first reflector disposed in this order after the optical means such that the linearly polarized light component passes through the first quarter-wave plate to be reflected by the first reflector, and passes through the first quarter-wave plate again, thereby re-entering the optical means as linearly polarized light of a second polarization direction perpendicular to the first polarization direction.

According to an aspect of the present invention, the light deflector further comprises a wave plate disposed on the object side of the optical means for converting the given circularly polarized light beam to a linearly polarized light beam.

According to another aspect of the present invention, the optical means comprises a polarization beam splitter for transmitting linearly polarized light having one of the first and second polarization directions and deflecting linearly polarized light having the other of the first and second polarization directions.

According to the preferred embodiments, the light deflector further comprises: light shielding means for shielding one of the two linearly polarized light components having the first and second polarization directions emitted from the optical element.

The present invention is further directed to a light deflector for deflecting a given circularly polarized light beam, comprising: deflecting means, having two reflecting planes facing each other at a predetermined angle, for deflecting a given light beam at a predetermined deflection angle; and converting means for converting the circularly polarized light beam to a linearly polarized light beam.

Preferably, the converting means comprises a quarter-wave plate.

According to the preferred embodiments, the converting means comprises a polarization beam splitter for transmitting first linearly polarized light of a first polarization direction and deflecting second linearly polarized light of a second polarization direction perpendicular to the first polarization direction.

The present invention is also directed to a light deflector, applicable to the above optical apparatus, for deflecting a given composite light beam including two circularly polarized light components having opposite handedness.

The present invention is further directed to a method of scanning an inner face of a cylindrical member with a light beam, comprising the steps of:

(a) generating a composite light beam including two circularly polarized light components which have opposite handedness to each other and whose principal rays coincide with each other;

(b) converting the two circularly polarized light components to two linearly polarized light components of cross polarization, splitting the two linearly polarized light components to make a predetermined angle to thereby produce two scanning beams, and deflecting the two scanning beams towards the inner face of the cylindrical member; and (c) relatively rotating the two scanning beams and the cylindrical member to thereby scan the inner face of the cylindrical member with the two scanning beams.

According to an aspect of the present invention, the step (b) comprises the steps of:

(b-1) converting the two circularly polarized light components to two linearly polarized light components of cross polarization;

(b-2) splitting the two linearly polarized light components to make a predetermined angle to thereby produce two scanning beams; and (b-3) deflecting the two scanning beams towards the inner face of the cylindrical member.

According to another aspect of the present invention, the step (b) comprises the steps of:

(b-1) deflecting the composite light beam towards the inner face of the cylindrical member;

(b-2) converting the two circularly polarized light components of the deflected composite light beam to two linearly polarized light components of cross polarization; and (b-3) splitting the two linearly polarized light components to make a predetermined angle to thereby produce two scanning beams incident on the inner face of the cylindrical member.

These and other objects, features, aspects and advantages of the present invention will become more apparent from the following detailed description of the present invention when taken in conjunction with the accompanying drawings.

DESCRIPTION OF TEE PREFERRED EMBODIMENTS

Figure 2:
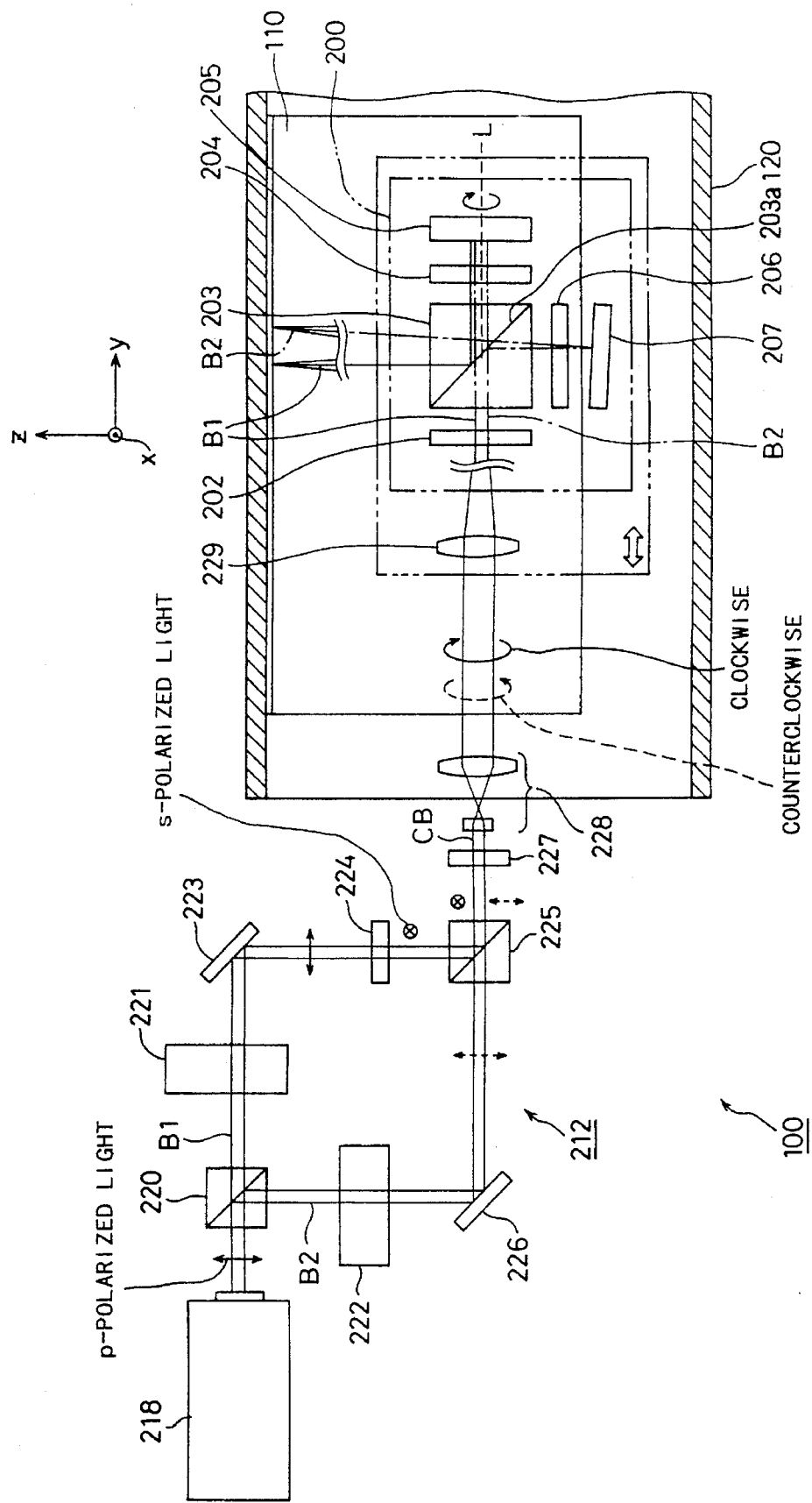
FIG. 2 schematically illustrates a drum-inner-face scanning image recording apparatus as a preferred embodiment of the invention.
Figure 3:
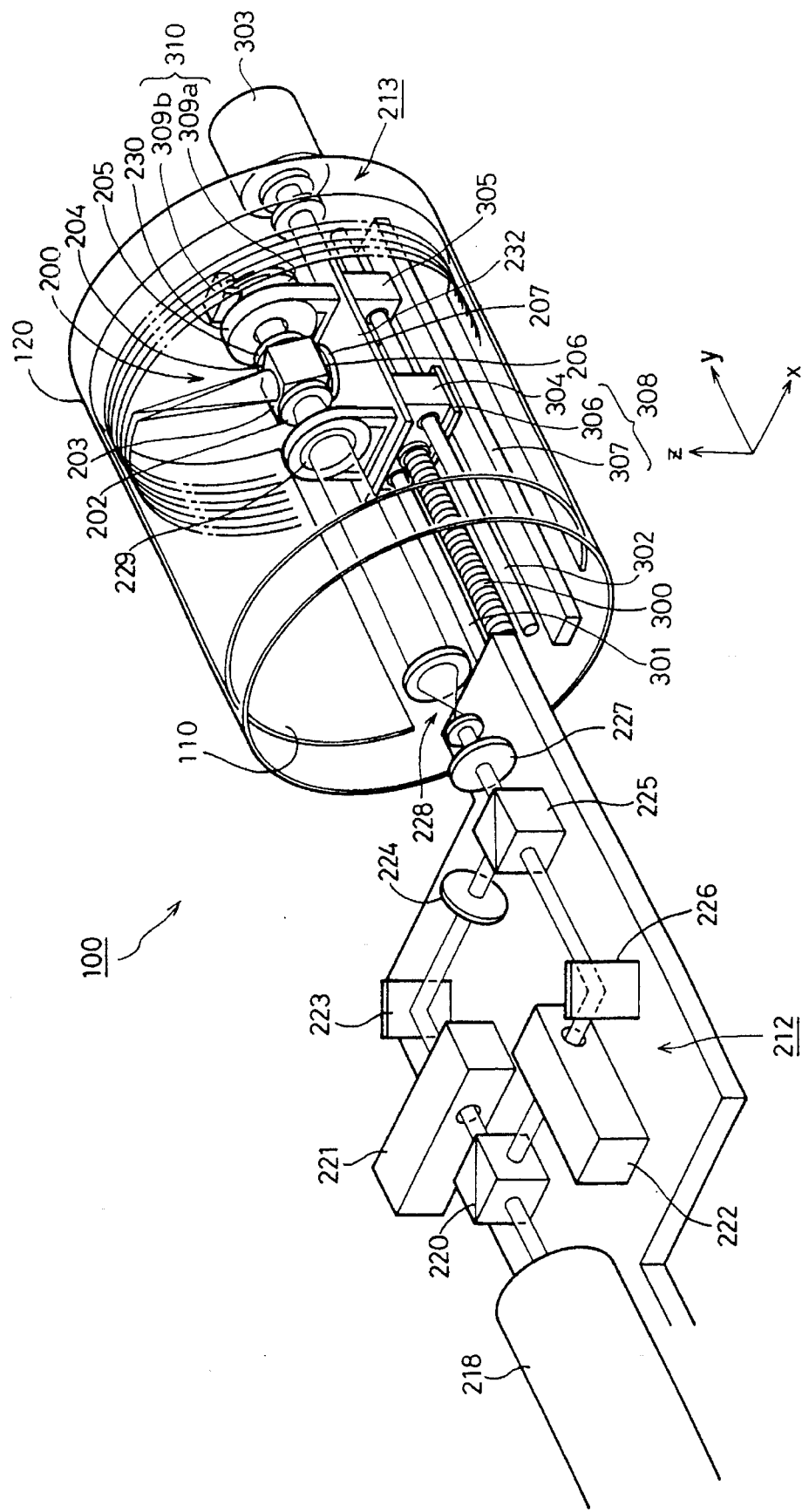
FIG. 3 is a perspective view illustrating the drum-inner-face scanning image recording apparatus of FIG. 2.
Figure 4:
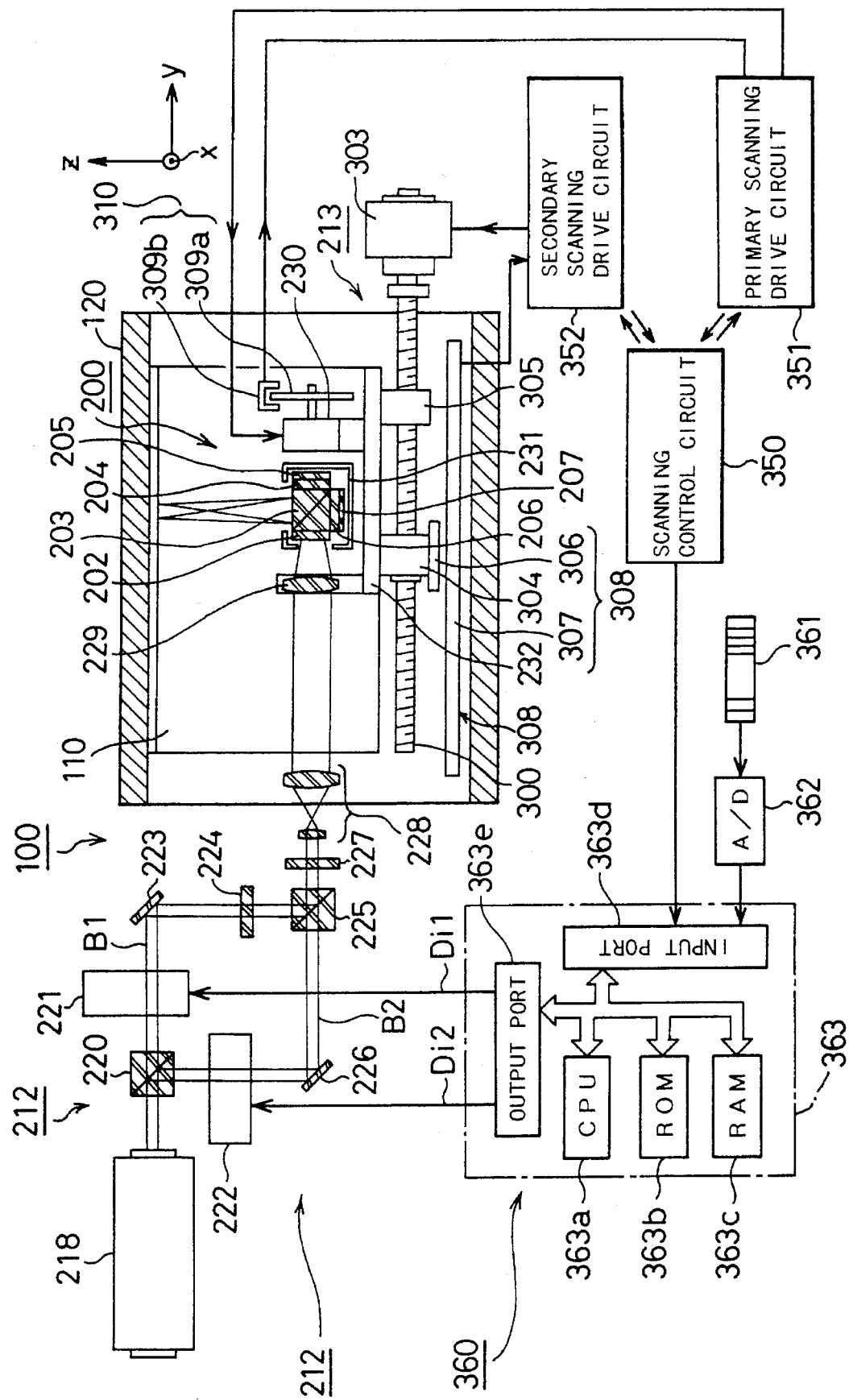
FIG. 4 is a block diagram illustrating the electrical structure of the drum-inner-face scanning image recording apparatus of FIG. 3.

FIG. 2 is a schematic view illustrating an image recording apparatus of a drum-inner-face scanning type according to the invention. FIG. 3 is a perspective view illustrating the apparatus of FIG. 2. FIG. 4 is a block diagram illustrating the electrical structure of the apparatus of FIG. 3. In these figures, diameters of light beams are enlarged for clarity.

The image recording apparatus 100 includes: a drum (or a cylinder) 120 with a photosensitive material 110 held on the inner surface thereof; a light deflector unit 200 disposed in the drum 120; a light beam output unit 212 for transmitting light beams to the light deflector unit 200; and a shuttle mechanism 213 (FIGS. 3 and 4) for moving the light deflector unit 200 back and forth along the central axis of the drum 120.

The light beam output unit 212 includes a laser source 218, a half prism 220, a first modulator (for example, Acousto-Optic Modulator) 221, a second modulator 222, a first reflector 223, a half-wave plate 224, a polarization beam splitter 225, a second reflector 226, a quarter-wave plate 227, and a beam expander 228. The laser source 218 emits a p-polarized light beam. An Ar laser, a He—Ne laser, or a laser diode can be used as the laser source 218.

The p-polarized light beam emitted from the laser source 218 is split into two light beams of different directions by the half prism 220; that is, a first light beam B1 and a second light beam B2. The first light beam B1 and the second light beam B2 are on-off controlled (modulated) by the first modulator 221 and the second modulator 222, respectively, in response to image signals representing an image to be recorded on the photosensitive material 110. The light beams pass through the respective modulator to expose pixels to be solid, while the beams are turned off not to expose pixels to be blank.

The modulated first light beam B1 is reflected by the first reflector 223, is converted from p-polarized light to s-polarized light by the half-wave plate 224, and goes into the polarization beam splitter 225. Meanwhile, the modulated second light beam B2 is reflected by the second reflector 226, and goes into the polarization beam splitter 225 as p-polarized light.

The polarization beam splitter 225 receives the s-polarized light beam B1 and the p-polarized light beam B2, which are components of cross polarization. The p-polarized light beam B2 transmits through a polarizer plane of the beam splitter 225 and the s-polarized light beam B1 is reflected by the polarizer plane, thereby producing seemingly one composite light beam having a common optical path. Namely, the principal rays of the light beams B1 and B2 completely overlap each other to form seemingly one composite light beam. The composite light beam then passes through the quarter-wave plate 227 and the beam expander 228 and goes into the light deflector unit 200.

The quarter-wave plate 227 is disposed in such a manner that a phase advance axis of the plate 227 has an angle of forty five degrees to both planes of polarization of the linearly polarized light beams B1 and B2. The p-polarized light beam B2 is converted to counterclockwise circularly polarized light, whereas the s-polarized light beam B1 to clockwise circularly polarized light. In the embodiment, the composite light beam including a p-polarized light component and an s-polarized light component goes into the quarter-wave plate 227 and is converted to a composite light beam CB including clockwise and counterclockwise circularly polarized light. The rotational direction of the circularly polarized light is generally called "handedness", and denotes a rotational direction of an electric vector seen from the direction opposite to the course of the circularly polarized light beam.

The quarter-wave plate 227 can be disposed at any desirable position on the optical path between the polarization beam splitter 225 and the light deflector unit 200.

The light beam transmitted through the quarter-wave plate 227 is enlarged by the beam expander 228 and goes into a focusing lens 229 of the light deflector unit 200. The focusing lens 229 makes the light beam convergent on the photosensitive material 110 held on the inner face of the drum 120.

The light deflector unit 200 further includes a first quarter-wave plate 202, a polarization beam splitter 203, a second quarter-wave plate 204, and a first mirror 205 disposed in this order in the incident direction of light beam or y direction in FIG. 2. A third quarter-wave plate 206 and a second mirror 207 are disposed in −z direction in FIG. 2 or a direction perpendicular to the course of the incident beam. The polarization beam splitter 203 is disposed in such a manner that its polarizer plane 203a has an angle of forty five degrees with respect to the incident direction of light beam. The second mirror 207 is inclined so that the normal of the reflecting plane has a small angle to the principal ray of the light beam coming from the polarization beam splitter 203.

These optical elements 202, 204, 205, 206 and 207 are adhered and fixed to the surface of the polarization beam splitter 203 with a photosetting resin (FIG. 4) and covered with aluminum casing 231. A main scanning motor 230 is disposed in the light deflector unit 200, and a rotary shaft of the main scanning motor 230 is connected with the casing 231. The main scanning motor 230 drives the light deflector unit 200 to integrally rotate around an axis L (FIG. 2) or the principal ray of the composite light beam CB.

Figure 5:
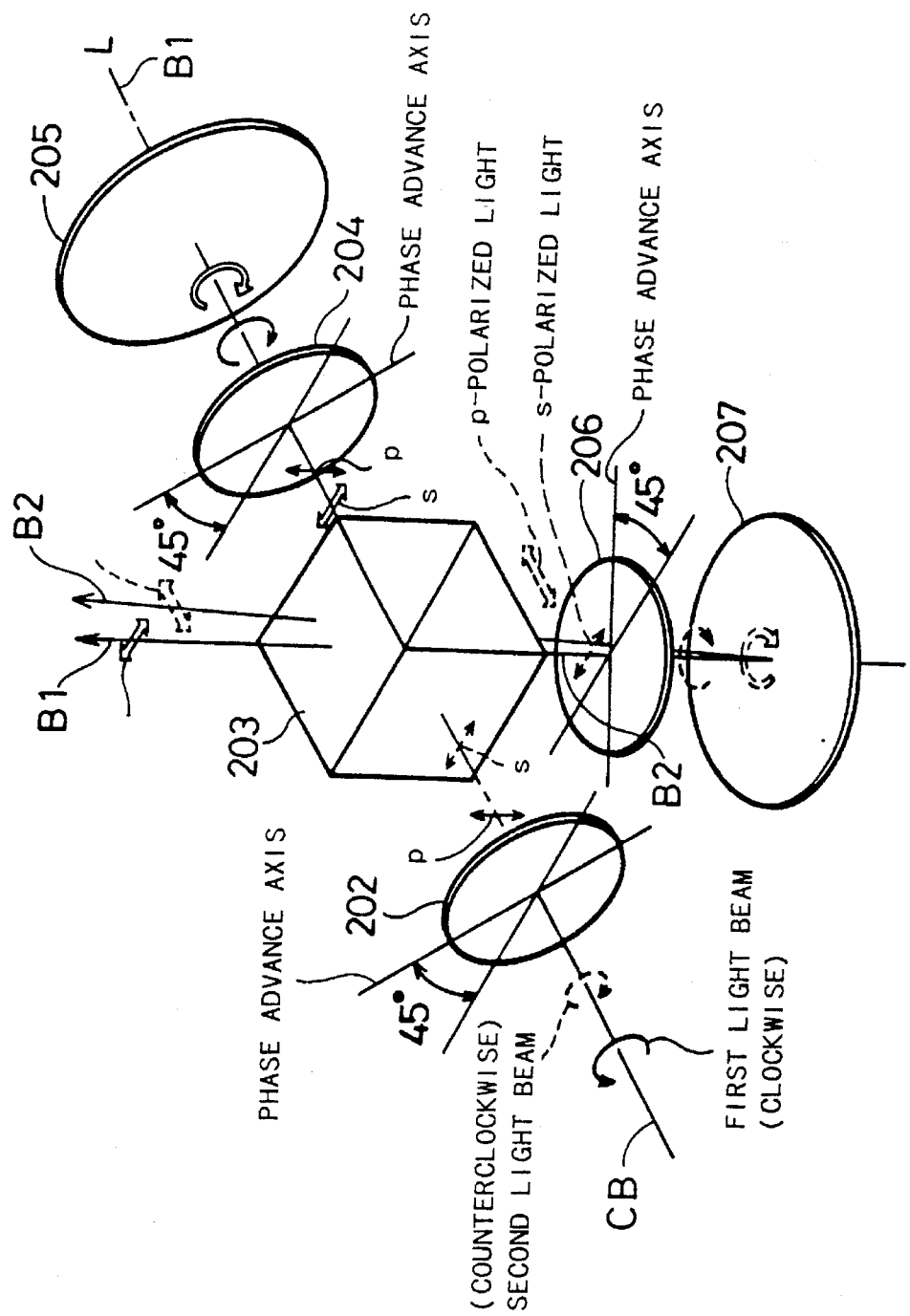
FIG. 5 is a perspective view showing optical paths in a light deflector incorporated in the drum-inner-face scanning image recording apparatus of FIG. 3.

Optical paths of the composite light beam CB and its components B1 and B2 in the light deflector unit 200 are explained in detail along with FIGS. 2 and 5. FIG. 5 is a perspective view showing the optical paths in the light deflector unit 200. FIG. 2 shows the optical paths of the principal rays of the light beams in the unit 200 for convenience of illustration.

The light beams B1 and B2 go into the first quarter-wave plate 202 to be converted to linearly polarized light beams each having the plane of polarization which has an angle of forty-five degrees with respect to a phase advance axis of the quarter-wave plate 202. The phase advance axis is positioned in such a manner that the clockwise circularly polarized light is converted to p-polarized light. Namely, the first light beam B1 is converted to p-polarized light, whereas the second light beam B2 to s-polarized light.

The light beams B1 and B2 then enter the polarization beam splitter 203, which transmits p-polarized light and reflects s-polarized light.

The first light beam B1, which is converted to p-polarized light by the first quarter-wave plate 202, passes through the beam splitter 203 and goes into the second quarter-wave plate 204. The phase advance axis of the second quarter-wave plate 204 is positioned in such a manner that p-polarized light is converted to counterclockwise circularly polarized light. The p-polarized first light beam B1 passing through the beam spitter 203 is hence converted to a counterclockwise circularly polarized light beam. The first light beam B1 is reflected by the first mirror 205, whereby the course of the light beam is completely inverted from y direction to −y direction. Namely, the first light beam B1 is converted from the counterclockwise circularly polarized light to the clockwise circularly polarized light, and re-enters the second quarter-wave plate 204. The clockwise circularly polarized light beam B1 is converted to s-polarized light by the second quarter-wave plate 204, and re-enters the beam splitter 203. The s-polarized first light beam B1 is reflected by the beam splitter 203, whereby the course is changed by 90 degrees to z direction.

Meanwhile, the second light beam B2 is converted to the s-polarized light beam by the first quarter-wave plate 202, and reflected by the beam splitter 203 in −z direction or the direction of the third quarter-wave plate 206. The phase advance axis of the third quarter-wave plate 206 is positioned in such a manner that s-polarized light is converted to counterclockwise circularly polarized light. Namely, the s-polarized second light beam B2 reflected by the beam splitter 203 is converted to a counterclockwise circularly polarized light beam. The second light beam B2 is then reflected by the second mirror 207 to z direction. The second light beam B2 is converted by this reflection from counterclockwise circularly polarized light to clockwise circularly polarized light, and re-enters the third quarter-wave plate 206. The counterclockwise circularly polarized light beam B2 is then converted to p-polarized light by the third quarter-wave plate 206, and re-enters the beam splitter 203. The p-polarized second light beam B2 passes through the beam splitter 203 in z direction.

Since the second mirror 207 is inclined at a small angle as described before, the second light beam B2 is reflected at the mirror 207 in a direction which is shifted from z direction by twice the small angle.

The course of the light beams B1 and B2 are thus shifted from each other by twice the small angle, and separately incident on the photosensitive material 110 held on the inner face of the drum 120.

Figure 1:
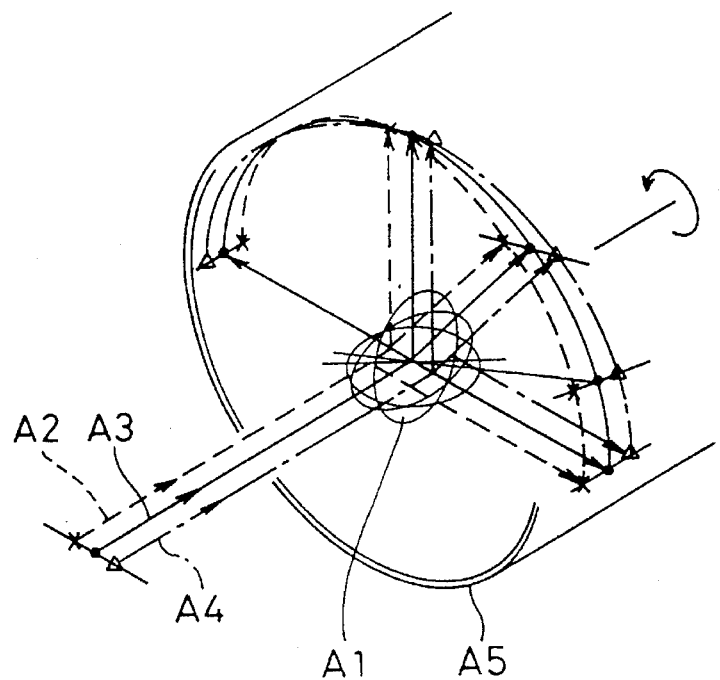
FIG. 1 schematically illustrates a problem of multibeam scanning for the drum-inner-face scanning type apparatus.
Figure 6A:
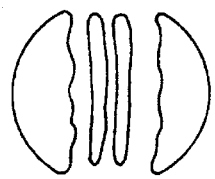
FIGS. 6(a) and 6(b) are explanatory views showing beam shapes when two incident light beams do and do not interfere with each other.
Figure 6B:
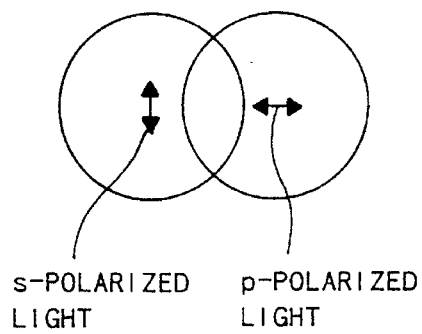

Since the light beams B1 and B2 are s-polarized light and p-polarized light, partial overlapping thereof does not cause any interference as seen in FIG. 6(b). This allows the two light beams to partly overlap each other, thereby preventing a dropout or scan split between adjacent scanning lines. If two beams were not light beams having planes of polarization perpendicular to each other, the two beams would be deformed due to interference as seen in FIG. 6(a).

In the image recording apparatus 100, the first quarter-wave plate 202, the polarization beam splitter 203, the second quarter-wave plate 204, the first mirror 205, the third quarter-wave plate 206, and the second mirror 207 form a light deflection means and a composite light beam splitting means in the present invention.

The structure of the shuttle mechanism 213, which shuttles back and forth along the axis of the drum 120, is described along with FIGS. 3 and 4.

The focusing lens 229 and the main scanning motor 230 are mounted on a table 232 disposed below the light deflector unit 200. the main scanning motor 230 is connected with the light deflector unit 200.

The shuttle mechanism 213 is a ball thread including a screw bar 300 and two guide bars 301 and 302, which are disposed parallel to the course of the incident light beams. The screw bar 300 is screwed into a first support leg 304 of the table 232, pierces a second support leg 305 of the table 232, and is connected to a rotary shaft of an subscanning motor 303. The guide bars 301 and 302 also pierce the support legs 304 and 305. The subscanning motor 303 actuates the shuttle mechanism 213: the motor rotates the screw bar 300 to move the first support leg 304, and thereby moves the table 232 along the guide bars 301 and 302. A magnet 306 is adhered to the lower face of the first support leg 304, and forms a magnetic linear encoder 308 together with a scale 307. The linear encoder 308 detects the position of the table 232 and thereby the position of a light beam emitted from the light deflector unit 200 in the course of the incident light beam or in the subscanning direction.

A code plate 309a is connected to the rotary shaft of the main scanning motor 230; the code plate 309a and a detector 309b form a rotary encoder 310. The rotary encoder 310 detects the rotational angle of the main scanning motor 230 and thereby the rotational angle of a light beam emitted from the light deflector unit 200.

The image recording apparatus 100 further includes a scanning control circuit 350 for regulating both of the main scanning motor 230 and the subscanning motor 303 as shown in FIG. 4. The scanning control circuit 350 controls a main scanning drive circuit 351 to drive the main scanning motor 230, and also controls an subscanning drive circuit 352 to drive the subscanning motor 303. Accordingly, the light deflector unit 200 rotates around the principal ray of the incident light beam at a constant rate, and simultaneously moves in a predetermined direction (for example, −y direction) along the principal ray at a constant speed.

Output signals from the linear encoder 308 and the rotary encoder 310 are supplied to the scanning control circuit 350 via the main scanning drive circuit 351 and the subscanning drive circuit 352. The scanning control circuit 350 receives the output signals and sends them to an image processor 360.

The image processor 360 produces image data to be supplied to the image recording apparatus 100. The image processor 360 includes: a one-dimensional capacitive photoelectric converting element 361 (hereinafter referred to as CCD) such as a CCD line sensor; an A/D converter 362 for converting the analog output signals from the CCD 361 to digital; and a process unit 363 for receiving the output signals from the A/D converter 362 and the scanning control circuit 350 and outputting processed image signals to the modulators 221 and 222.

The process unit 363 is an arithmetic logic circuit including a CPU (central processing unit) 363a, a ROM (read only memory) 363b, and a RAM (random access memory) 363c. The process unit 363 further includes an input port 363d for receiving the output signals from the A/D converter 362 and the scanning control circuit 350, and an output port 363e for outputting processed image signals to the modulators 221 and 222.

Image signals produced by photoelectric scanning of an original (not shown) with the CCD 361 are converted to multi-tone digital image data by the A/D converter 362 and temporarily stored in the RAM 363c of the process unit 363. The process unit 363 successively reads out the stored image data, generates halftone dot image data representing the original image, decomposes the halftone dot image data to two sets of image data Di1 and Di2 of different channels, and outputs the image data Di1 and Di2 to the modulators 221 and 222, respectively. The image data Di1 and Di2 are binary data, and represent on and off of the light beam for every dot by the values 'one' and 'zero'. The modulators 221 and 222 on-off control the light beams B1 and B2 in response to the image data Di1 and Di2. The process unit 363 also receives the output signals from the scanning control circuit 350 and outputs image data corresponding to the scanning position to the modulators 221 and 222.

As described above, in the image recording apparatus 100 of the drum-inner-face scanning type, two modulated light beams are incident on the inner face of the drum 120 via the light deflector unit 200 while rotating about the axis of the drum 120 and moving along the axis of the drum 120. Consequently, the inner face of the drum 120 is helically exposed, and an image is recorded on the photosensitive material 110 held on the inner face of the drum 120.

Since the composite light beam CB having two circularly polarized light components is split into two linearly polarized light beams B1 and B2 by the beam splitter 203 in the light deflector unit 200, the spatial relation of the courses of the two light beams B1 and B2 with the beam splitter 203 is maintained while the light deflector unit 200 is rotating. Accordingly, the disposition of light spots on the photosensitive material 110 is also maintained at every position about the drum 120. This allows image recording with two light beams.

In the light deflector unit 200, each light beam is deflected twice in the deflector unit 200: at the mirror 205 and the polarization beam splitter 203, and at the polarization beam splitter 203 and the mirror 207. The angle is fixed between the polarizer plane 203a of the polarization beam splitter 203 and the mirror 205, and between the polarizer plane 203a and the mirror 207. Geometrical optics teaches that rays of light reflected at two reflectors facing each other at a predetermined crossing angle show a constant deflection angle. The course of the emitted light beam can thus be independent of wobble of the light deflector unit 200. Here a wobble of the light deflector unit 200 denotes a swing thereof around an axis perpendicular to the incident direction of the light beam and parallel to the polarizer plane 203a, or an axis perpendicular to the plane of FIG. 2. Accordingly, adverse effects of wobble or undesirable fluctuation of the emitting direction are efficiently eliminated.

Figure 7:
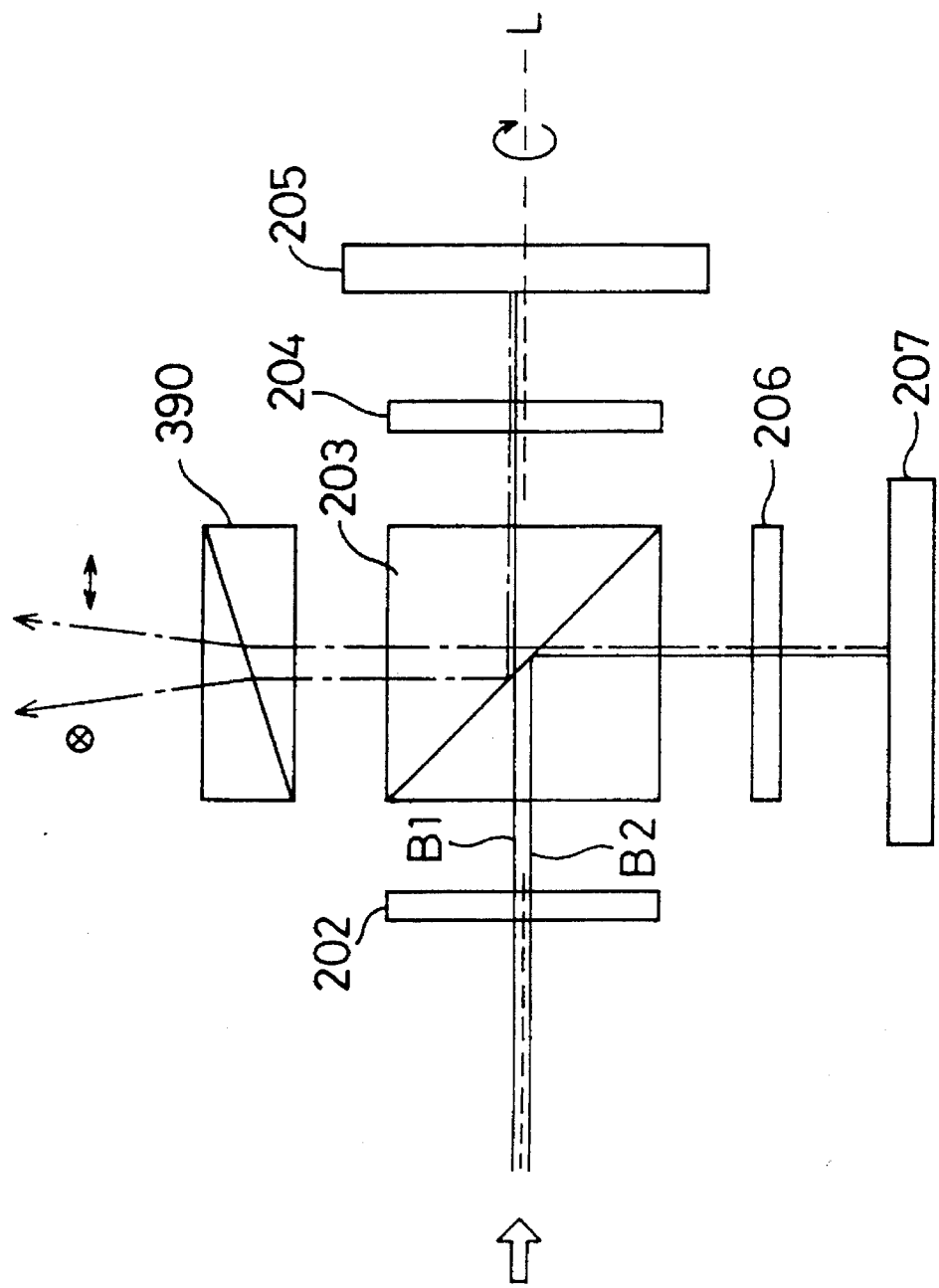
FIG. 7 is a schematic view illustrating modification of the embodiment of FIG. 1.

Although the second mirror 207 is slightly inclined so that the courses of the emitted light beams B1 and B2 are a little shifted from parallelism. Alternatively, a Wollaston prism can be used for splitting the light beams B1 and B2. As shown in FIG. 7, the second mirror 207 is disposed in such a manner that the reflecting plane of the mirror 207 is perpendicular to the incident light beam B2. Namely, the light beams B1 and B2 are reflected by the mirrors 205 and 207 respectively, and return in the same reverse courses to the polarization beam splitter 203. The light beam B1 is then reflected at the polarizer plane of the polarization beam splitter 203, while the light beam B1 passes through it. Thus the two beams B1 and B2 go upward, and are split by the Wollaston prism 390.

The deflector unit shown in FIG. 7 has the same effects as that in the first embodiment.

Figure 8:
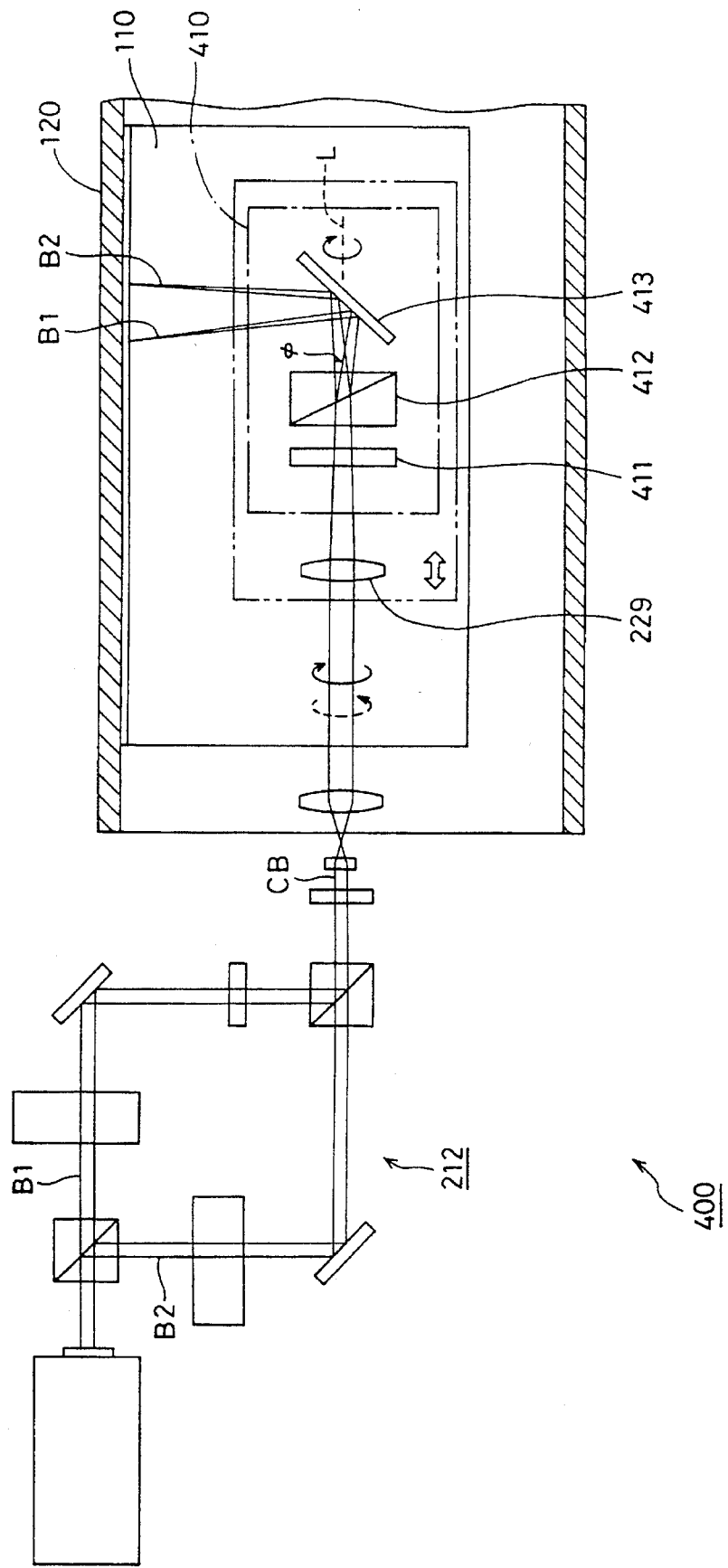
FIG. 8 is a schematic view illustrating a drum-inner-face scanning image recording apparatus as another embodiment of the invention.
Figure 9:
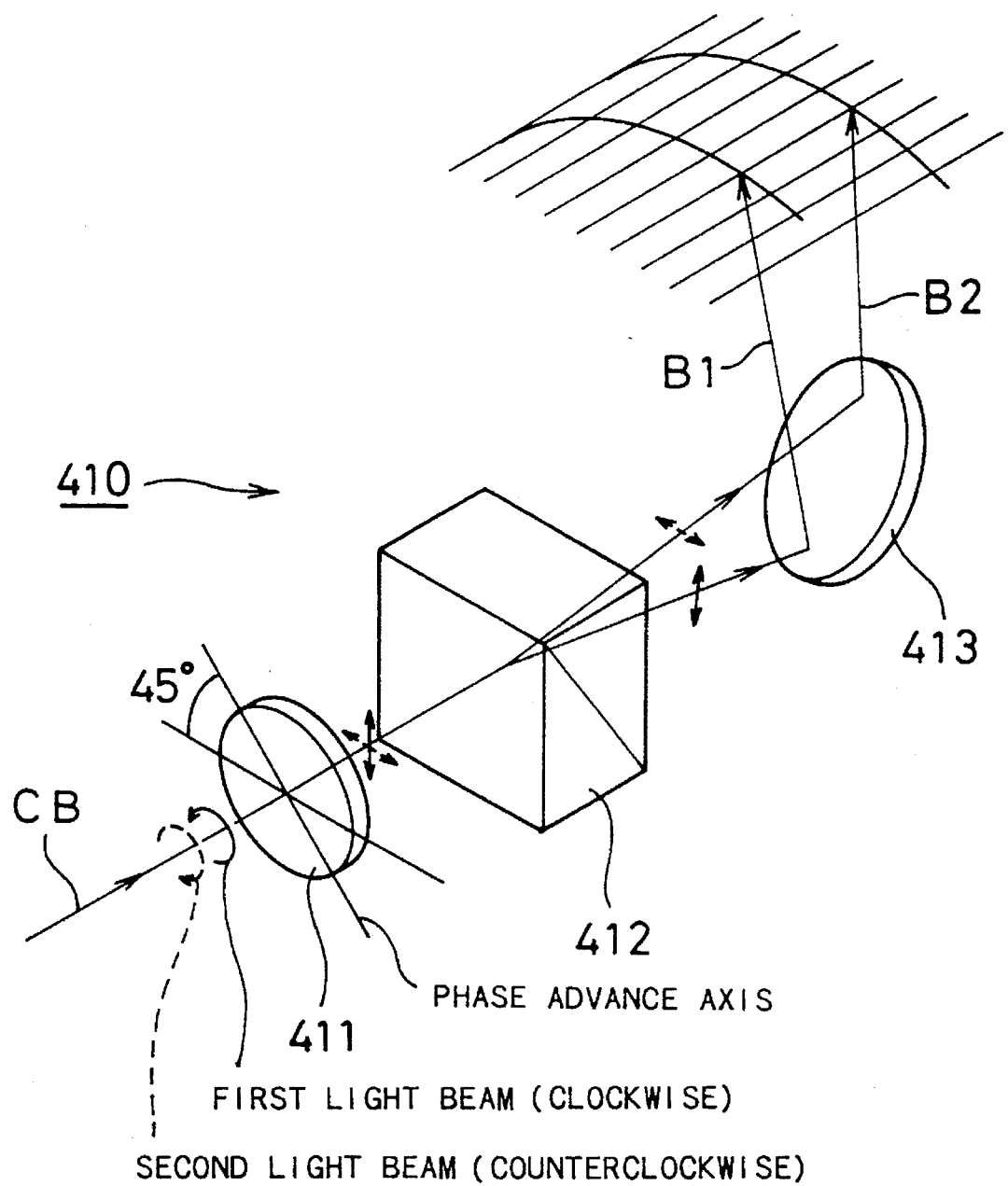
FIG. 9 is a perspective view of the drum-inner-face scanning image recording apparatus of FIG. 8.

FIG. 8 is a schematic view illustrating an image recording apparatus of a drum-inner-face scanning type as the second embodiment of the invention; and FIG. 9 is a perspective view of the image recording apparatus of FIG. 8.

The image recording apparatus 400 has the same structure as the apparatus 100 of the first embodiment except a light deflector unit 410. The light deflector unit 410 includes a quarter-wave plate 411, a Wollaston prism 412, and a slant mirror 413 with a reflecting face inclined by forty five degrees with respect to a rotational axis L; these elements are disposed in this order along the incident direction of a composite light beam CB. The light deflector unit 410 is driven by a main scanning motor and a subscanning motor (not shown) in the same manner as the first embodiment to be rotated around and moved along the axis L. The axis L coincides with the principal ray of the composite light beam CB and the axis of the drum 120.

The composite light beam CB is first converted to include a p-polarized light component and an s-polarized light component by the quarter-wave plate 411. The composite light beam CB then enters the Wollaston prism 412, which splits the composite light beam to the p-polarized light beam B1 and the s-polarized light beam B2 at a separation angle φ. The light beams B1 and B2 are reflected nearly perpendicularly by the slant mirror 413, and separately converge on the photosensitive material 110.

According to the second embodiment, the quarter-wave plate 411 and the Wollaston prism 412 split the composite light beam CB to the light beams B1 and B2 as a function of different rotational directions of the circularly polarized light. The slant mirror 413 then changes the course of the light beams B1 and B2. Here the slant mirror 413 functions as a deflecting unit and the quarter-wave plate 411 and the Wollaston prism 412 work as a composite light beam splitting unit.

Since the Wollaston prism 412 and the slant mirror 413 are integrally rotated and moved by the main scanning motor and the subscanning motor, the relation of the two light beams B1 and B2 with the slant mirror 413 is maintained while the light deflector unit 410 is rotating. Accordingly, the disposition of light spots on the photosensitive material 110 is maintained at every position about the drum 120. In other words, the apparatus of the second embodiment also efficiently records an image with two channels of light beams.

Figure 10:
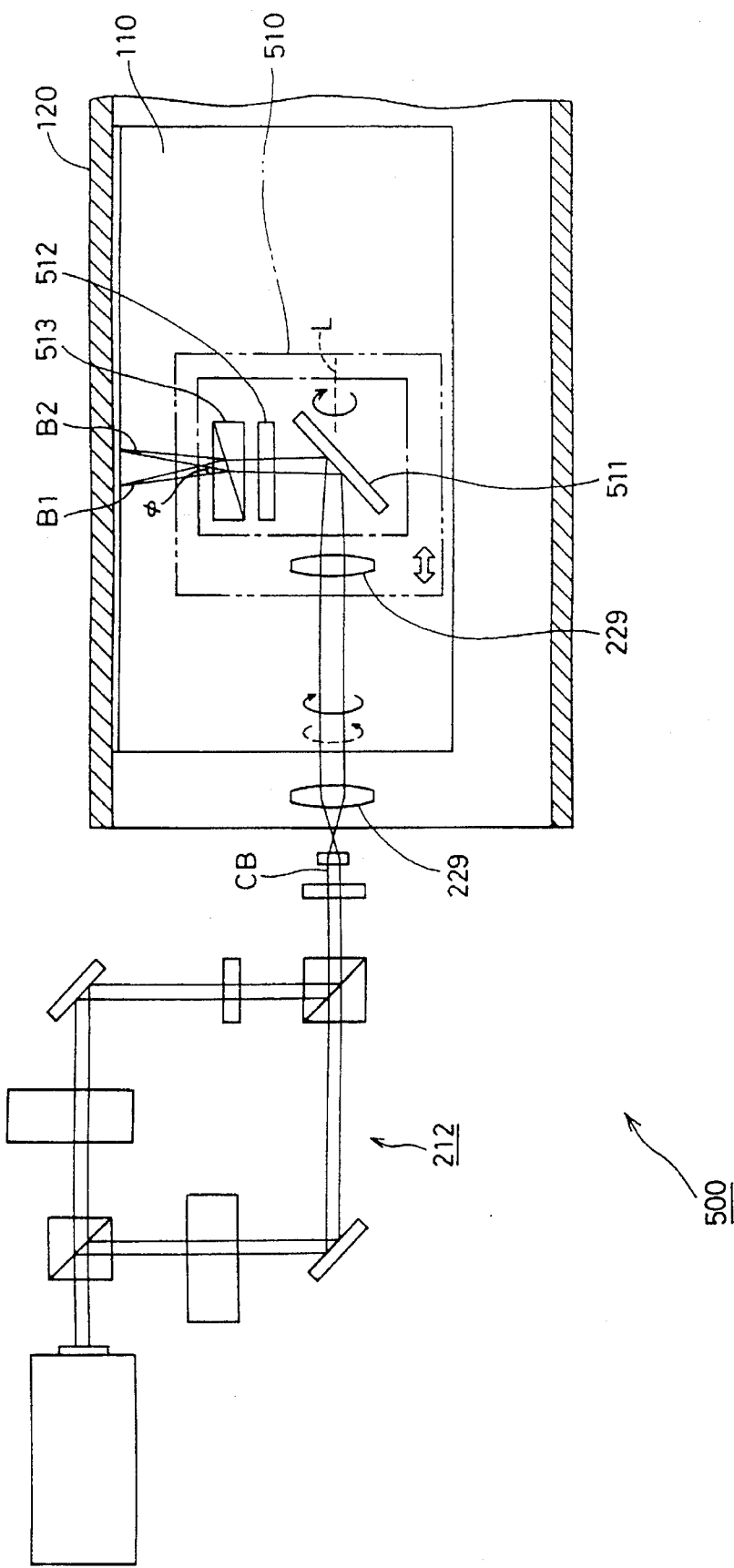
FIG. 10 is a schematic view illustrating a drum-inner-face scanning image recording apparatus as still another embodiment of the invention.
Figure 11:
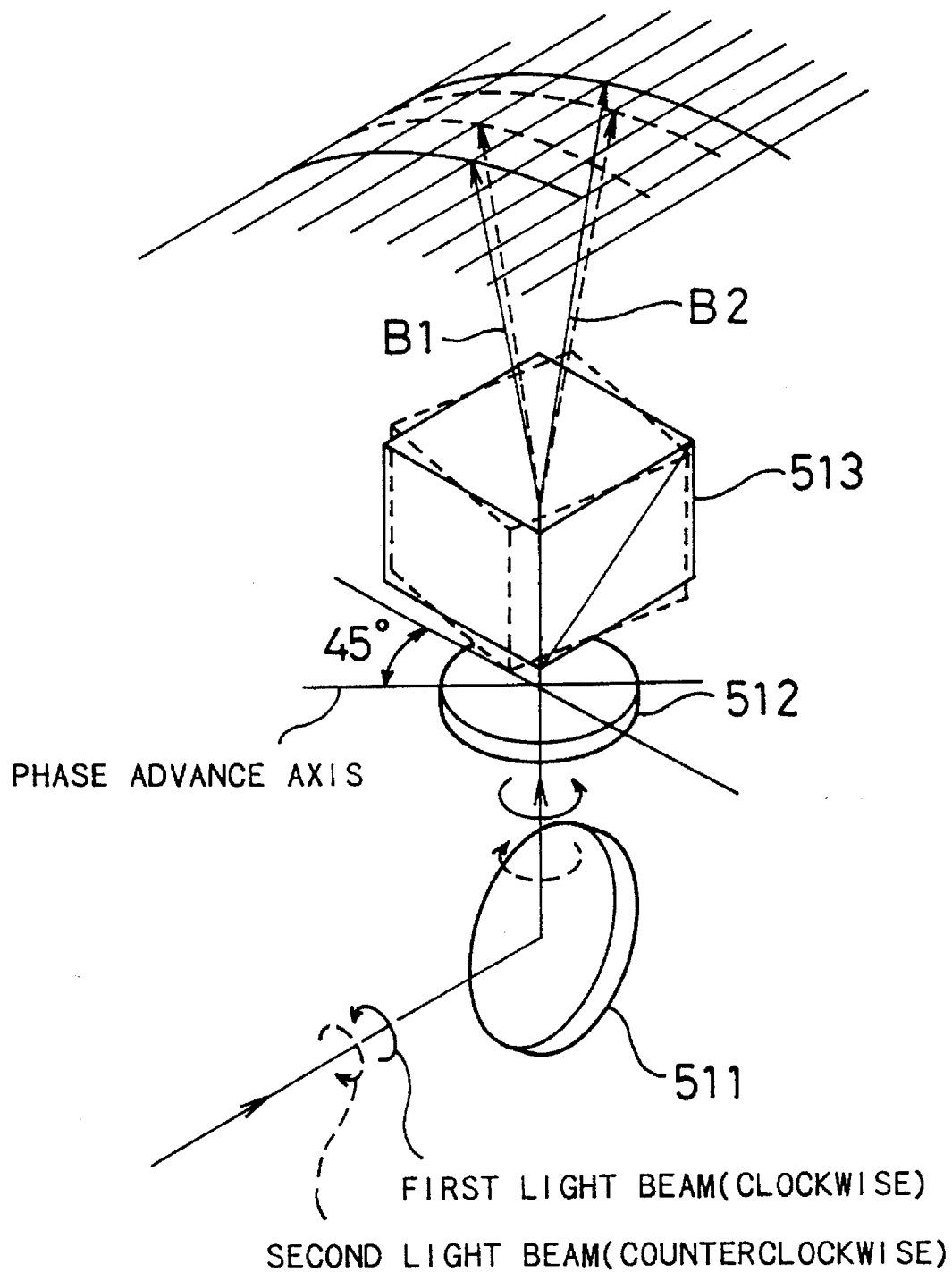
FIG. 11 is a perspective view of the drum-inner-face scanning image recording apparatus of FIG. 10.

FIG. 10 is a schematic view illustrating a third embodiment of the present invention; and FIG. 11 is a perspective view of the image recording apparatus of FIG. 10.

The image recording apparatus 500 has the same structure as the second embodiment except a light deflector unit 510. The light deflector unit 510 includes: a slant mirror 511 disposed in the incident direction of the composite light beam CB emitted from the light beam output unit 212; a quarter-wave plate 512, and a Wollaston prism 513 disposed in the course of the composite light beam CB reflected by the slant mirror 511.

The composite light beam CB is perpendicularly reflected by the slant mirror 511 and proceeds to the quarter-wave plate 512. The slant mirror 511 converts the first light beam B1 in the composite light beam CB to counterclockwise circularly polarized light on reflection, and the second light beam B2 to clockwise circularly polarized light. The light beam B1 is then converted to p-polarized light by the quarter-wave plate 512, and the light beam B2 to s-polarized light. The two beams B1 and B2 are then separated by the Wollaston prism 513 at a separation angle φ.

Generally, reflection of light causes retardation between a p-polarized light component and an s-polarized light component. The retardation causes each of the two linearly polarized light beams passing through the quarter-wave plate 512 to include a slight amount of another linearly polarized light component. Accordingly, the slant mirror 511 is preferably coated with a dielectric multi-layered film to prevent the retardation due to reflection.

In the light deflector unit 510, the slant mirror 511 functions as a polarizing unit, and the quarter-wave plate 512 and the Wollaston prism 513 work as a composite light beam splitting unit.

Since the circularly polarized light beam CB is split to the two light beams B1 and B2 by the quarter-wave plate 512 and the Wollaston prism 513 which are rotating together, the disposition of light spots on the photosensitive material 110 is maintained at any position about the drum 120.

The light deflector unit 512 has another advantage of being able to change the directions of the pair of linearly polarized light beams B1 and B2 emitted from the quarter-wave plate 512 by rotating the quarter-wave plate 512. When the quarter-wave plate 512 and the Wollaston prism 513 are integrally rotated as shown by the broken line of FIG. 11, the directions of emission are changed around the principal ray of the composite light beam entering into the Wollaston prism 513. The scanning pitches of the two channels of the light beams B1 and B2 are thus adjustable on the photosensitive material 110.

Incidentally, other polarization beam splitters such as a Taylor prism and a Rochon prism can be used instead of the Wollaston prism.

Figure 12:
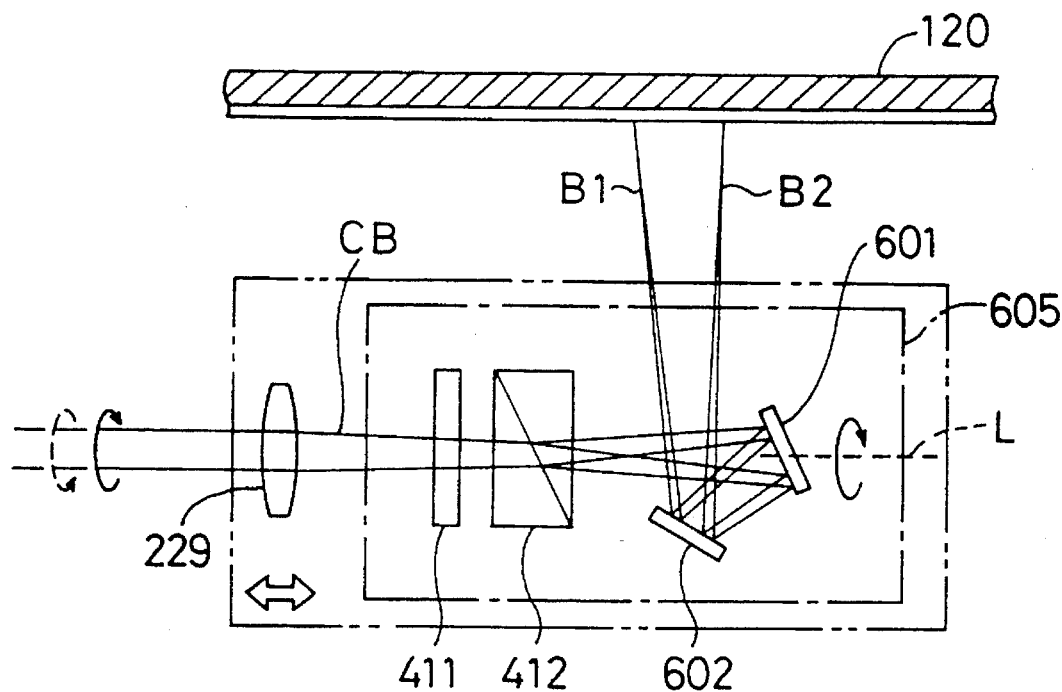
FIG. 12 is a schematic view illustrating modification of the light deflector shown in FIG. 8.

Although the slant mirrors 413 and 511 are used as the deflecting unit in the second or the third embodiment, respectively, they can be replaced by two reflectors facing each other at a predetermined angle to eliminate the effects of wobble as shown in FIG. 12. A light deflector unit 605 includes: a quarter-wave plate 411; a Wollaston prism 412; and two mirrors 601 and 602 facing each other at a predetermined angle of, for example, approximately thirty degrees. These elements are disposed in this order along the incident direction of the composite light beam CB.

The simple structure of FIG. 12 maintains the directions of emission of the light beams B1 and B2 constant even when an axis L of the light deflector unit 605 undesirably wobbles. The modified embodiment thus efficiently eliminates effects of the wobble as the first embodiment.

Figure 13:
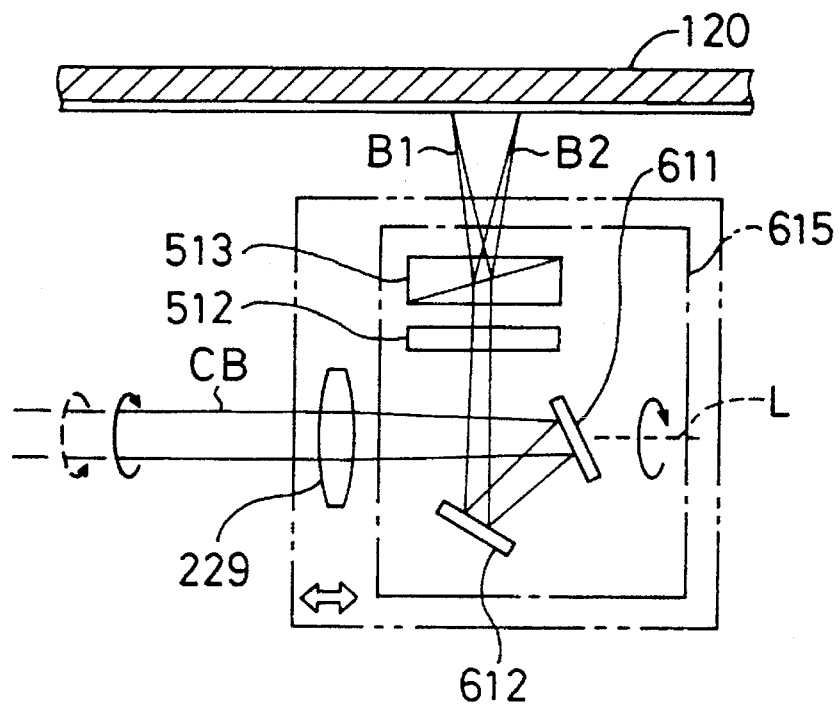
FIG. 13 is a schematic view illustrating modification of the light deflector shown in FIG. 10.

FIG. 13 shows another light deflector unit 615. The light deflector unit 615 includes: two mirrors 611 and 612 facing each other at a predetermined angle; and a quarter-wave plate 512 and a Wollaston prism 513 disposed in the direction of the composite light beam CB reflected by the mirrors 611 and 612.

The mirrors 611 and 612 are preferably coated with a dielectric multi-layered film as in the third embodiment of FIG. 10. The simple structure of FIG. 13 also efficiently eliminates the effects of wobble.

Figure 14:
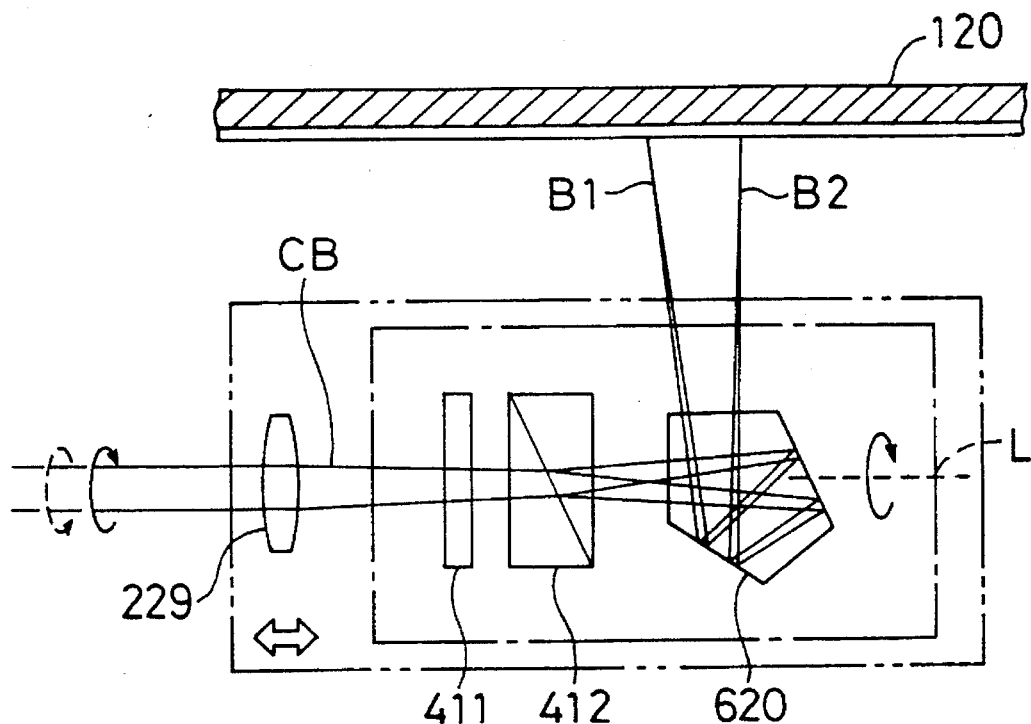
FIG. 14 is a schematic view illustrating further modification of the light deflector shown in FIG. 8.

FIG. 14 shows another modification of the light reflector unit, in which a pentagonal prism 620 is used in place of the two mirrors 601 and 602 of FIG. 12. This modification also efficiently eliminates the effects of wobble.

Figure 15:
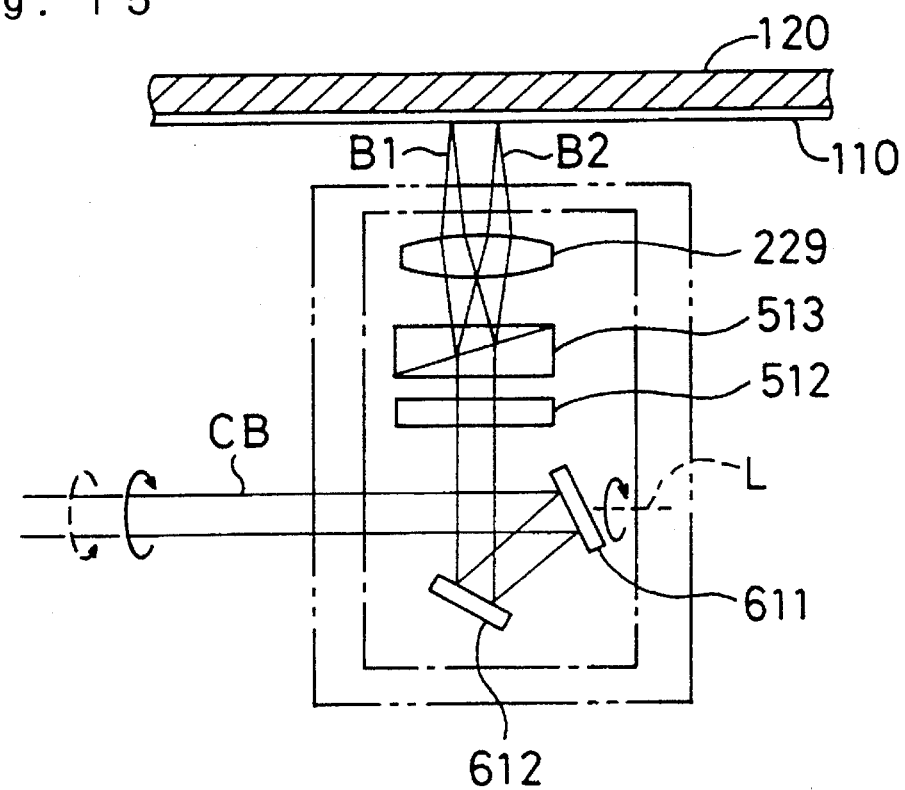
FIG. 15 is a schematic view illustrating another light deflector which forms a telecentric optical system.

In FIGS. 12 through 14, the focusing lens 229 can be positioned on the optical path between the light deflector unit and the drum 120 as shown in FIG. 15. In this case, the focusing lens 229 is placed such that its front focal point coincides with the branch point of the light beams B1 and B2 in the Wollaston prism 513 and that its rear focal point is on the photosensitive material 110. This arrangement forms a telecentric optical system. The telecentric optical system maintains the interval between the two beam spots on the photosensitive material 110 even when the distance between the photosensitive material 110 and the focusing lens 229 changes, for example, due to partial detachment of the photosensitive material 110 from the drum 120.

In the light deflector units shown in FIGS. 12 through 15, partial overlapping of the light beams B1 and B2 does not cause any interference as shown in FIG. 6(b) because the light beams B1 and B2 are components of cross polarization.

Figure 16:
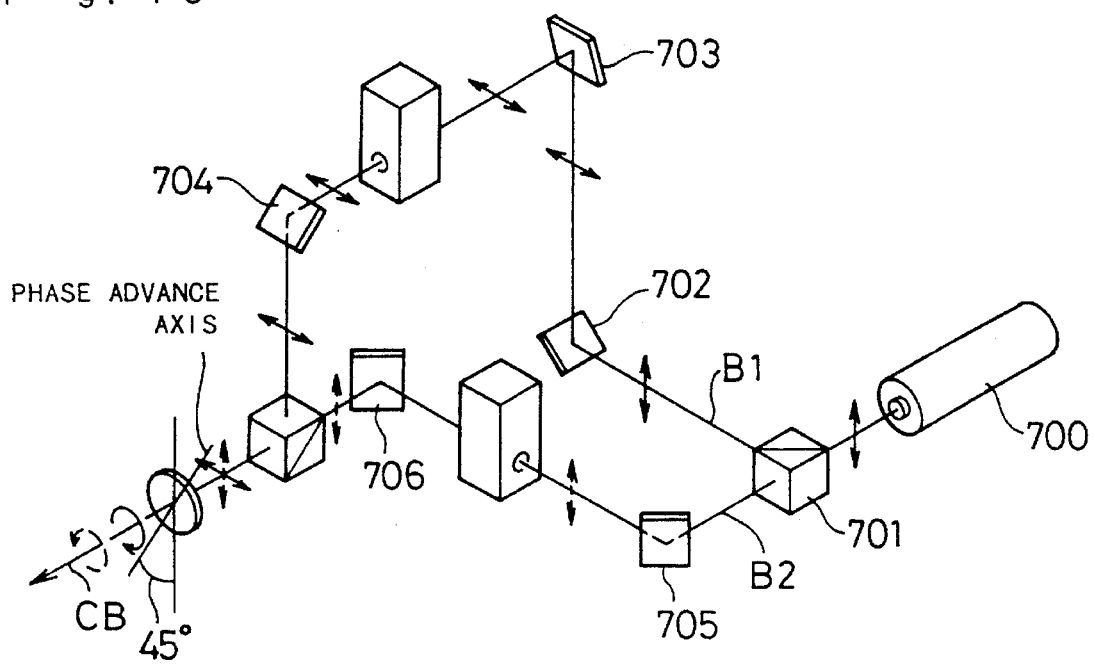
FIG. 16 is a perspective view showing a structure of a light beam output unit.

FIG. 16 illustrates a modification of the light beam output unit 212 of FIG. 2. This light beam output unit produces the two light components B1 and B2 of cross polarization without the half-wave plate 224 (FIG. 2). A light beam emitted from a laser source 700 is split to two light beams B1 and B2 of different directions by a half prism 701. One light beam B1 follows an optical path through three mirrors 702, 703, and 704, while the other light beam B2 follows another optical path through two mirrors 705 and 706. The difference in the optical paths makes the planes of polarization of the light beams B1 and B2 crossed each other.

Figure 17:
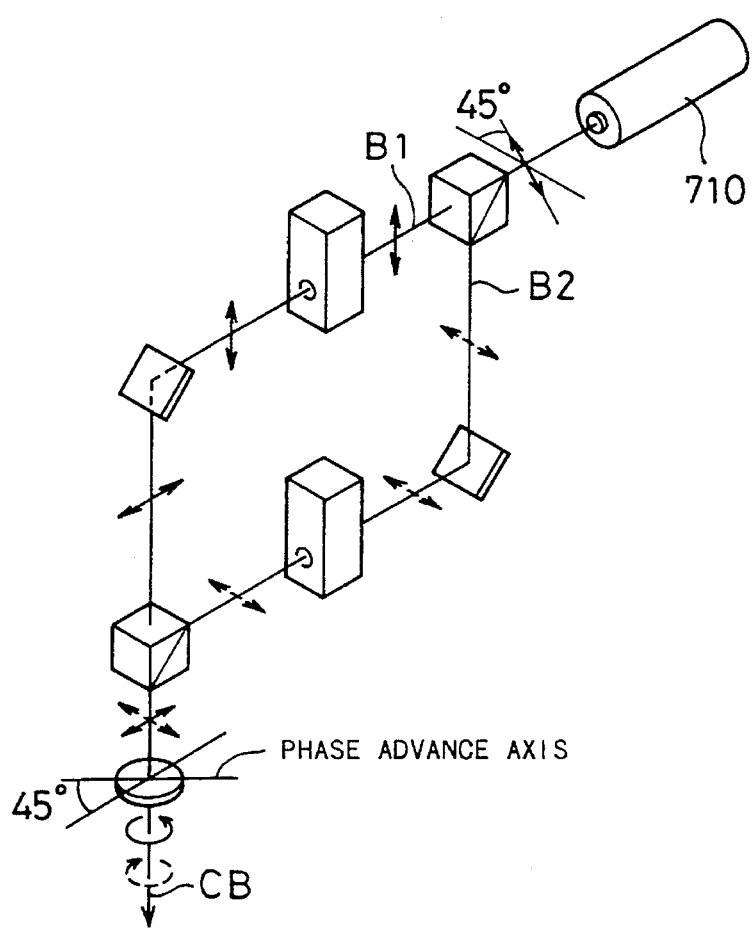
FIG. 17 is a perspective view showing another structure of the light beam output unit.

FIG. 17 is another modification of the light beam output unit. The orientation of a laser source 710 is adjusted such that the plane of polarization of a linearly polarized light beam emitted from the laser source 710 is inclined at an angle of 45 degrees to horizontal. The light beam emitted from the laser source 710 enters a polarization beam splitter 711 to be split to light beams in perpendicular directions and emitted as a p-polarized first light beam B1 and an s-polarized second light beam B2.

Figure 18:
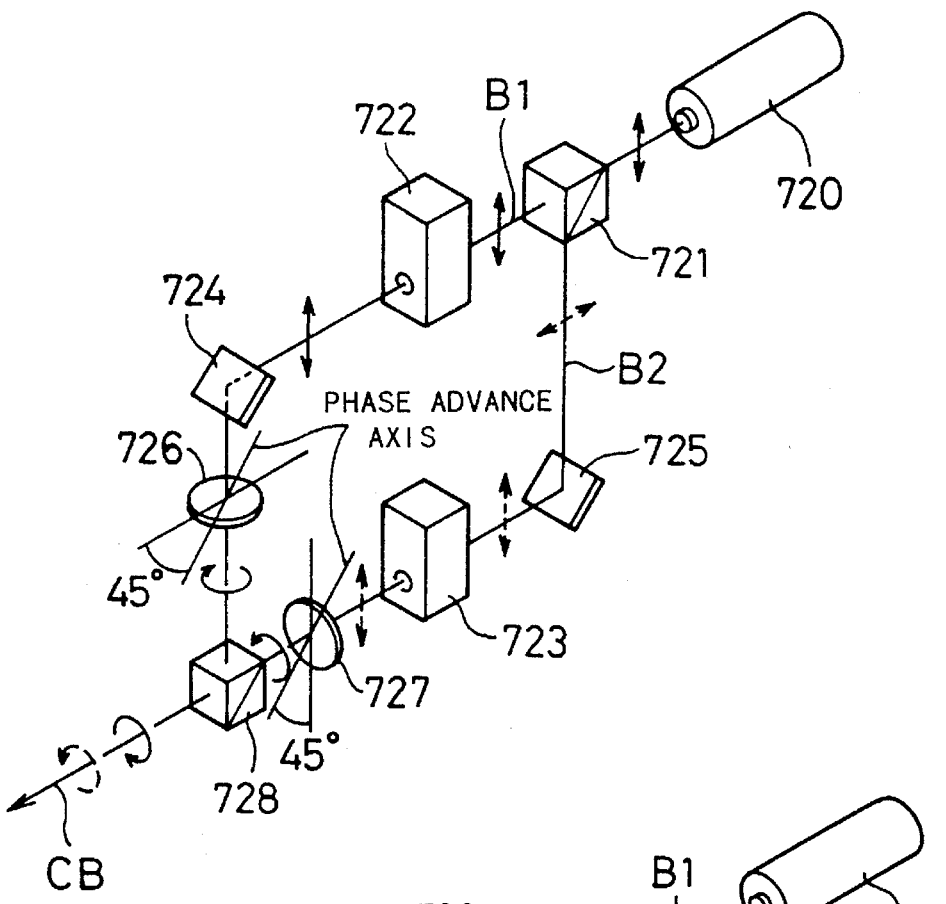
FIG. 18 is a perspective view showing still another structure of the light beam output unit.

FIG. 18 is still another modification of the light beam output unit. A polarized light beam emitted from a laser source 720 is split to light beams B1 and B2 in perpendicular directions by a half prism 721. The light beams B1 and B2 pass through modulators 722 and 723, and are reflected by mirrors 724 and 725, and enter quarter-wave plates 726 and 727, respectively. Accordingly, the light beams B1 and B2 are converted to counterclockwise circularly polarized light by the quarter-wave plates 726 and 727. The light beam B1 is reflected by the half prism 728 to become clockwise circularly polarized light, and thereby the half prism 728 emits the composite light beam CB including clockwise and counterclockwise circularly polarized light component.

Figure 19:
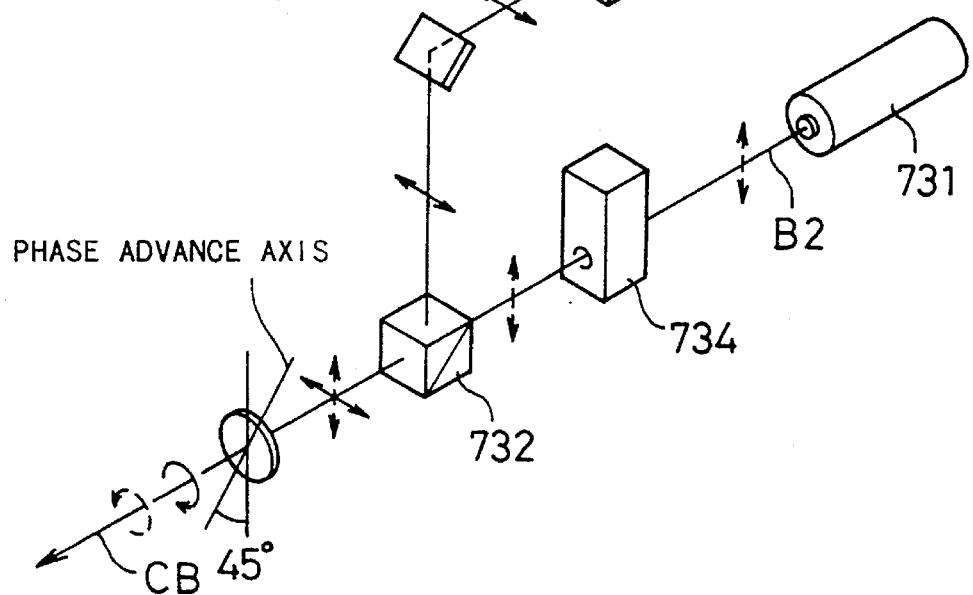
FIG. 19 is a perspective view showing another structure of the light beam output unit.

FIG. 19 is another modification of the light beam output unit comprising two laser sources. An s-polarized light beam B1 is emitted from a first laser source 730 while a p-polarized light beam B2 is from a second laser source 731. The modulated light beams B1 and B2 enter a polarization beam splitter 732 to form a composite light beam CB including linearly polarized components having cross planes of polarization. Use of laser diodes for the laser sources 730 and 731 can omit the modulators 733 and 734.

Figure 20:
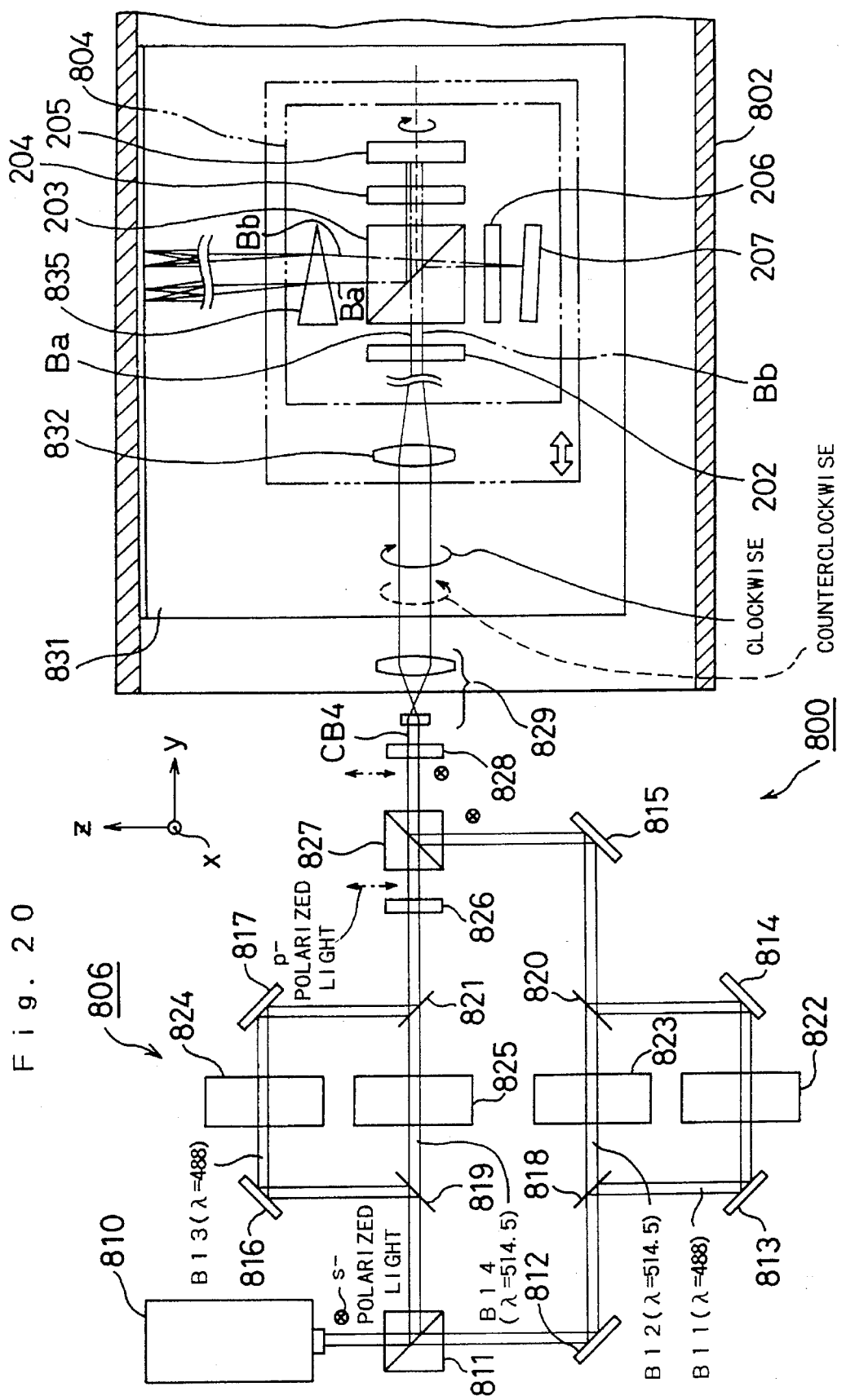
FIG. 20 is a schematic view illustrating a drum-inner-face scanning image recording apparatus as another embodiment of the invention.

FIG. 20 illustrates a fourth embodiment of the invention. This image recording apparatus 800 records an image with four beams. The composite light beam CB4 includes two pairs of clockwise and counterclockwise circularly polarized light components where the two pairs are different in wavelength.

The image recording apparatus 800 includes a drum 802, a light deflector unit 804, a light beam output unit 806, and a shuttle mechanism (not shown) for shuttling back and forth the light deflector unit 804.

The light beam output unit 806 includes a laser source 810, a half prism 811, six mirrors 812 through 817, four dichroic mirrors 818 through 821, first through fourth modulators such as AOMs 822 through 825, a half-wave plate 826, a polarization beam splitter 827, a quarter-wave plate 828, and a beam expander 829. The laser source 810 is a multi-color laser, which simultaneously emits plural beams of different wavelengths; in the embodiment, the laser source 810 emits p-polarized light beams of 488 nm and 514.5 nm. The laser source 810 is, for example, an Ar laser or a Kr laser.

The p-polarized light beam emitted in -z direction from the laser source 810 is split to two directions, that is, -z and y directions, by the half prism 811. The light beam proceeding in -z direction is reflected by the mirror 812 to proceed in y direction. The reflected light beam enters the first dichroic mirror 818. The dichroic mirrors 818 through 821 are prisms which totally reflect a light component of a certain wavelength (λ=488 nm in the embodiment) and transmit a light component of the other wavelengths.

Accordingly, a light component of 488 nm (hereinafter referred to as first light beam B11) is reflected by the dichroic mirror 818 to proceed in -z direction, and further reflected by the mirror 813 to proceed in y direction to go into the first modulator 822. A light beam component of 514.5 nm (hereinafter referred to as second light beam B12) passing through the first dichroic mirror 818 goes into the second modulator 823.

Meanwhile, the light beam reflected by the half prism 811 proceeding in y direction goes into the second dichroic mirror 819, which changes the course of a light component of 488 nm (hereinafter referred to as a third light beam B13) in z direction. The third light beam B13 is reflected by the mirror 816 to proceed in y direction and goes into the third modulator 824. A light beam component of 514.5 nm (hereinafter referred to as fourth light beam B14) passes through the second dichroic mirror 819 and goes into the fourth modulator 825.

The first through the fourth modulators 822 to 825 respectively on-off control (modulate) the first through the fourth light beams B11 to B14 in response to given image signals representing an image to be recorded on a photosensitive material 831.

The first light beam B11 is reflected by the mirror 814 to proceed in z direction and further reflected by the third dichroic mirror 820 in y direction. The second light beam B12 passes through the third dichroic mirror 820. As a result, a first multi-colored light beam consisting of 488 nm and 514.5 nm components is emitted from the third dichroic mirror 820. The first multi-colored light beam is reflected by the mirror 815 to proceed in z direction to the polarization beam splitter 827.

Meanwhile, the third light beam B13 is reflected by the mirror 817 to proceed in -z direction and further reflected by the fourth dichroic mirror 821 in y direction. The fourth light beam B14 passes through the fourth dichroic mirror 821. As a result, a second multi-colored light beam consisting of 488 nm and 514.5 nm components is emitted from the fourth dichroic mirror 821. This second multi-colored light beam is then incident on the half-wave plate 826.

The components of the second multi-colored light beam are converted from s-polarized light to p-polarized light by the half-wave plate 826, and goes into the polarization beam splitter 827. On the other hand, the first multi-colored light beam going into the beam splitter 827 has components of s-polarized light.

Accordingly, the polarization beam splitter 827 produces a seemingly single composite beam including two pairs of multi-colored components: one pair B11 and B12 is of p-polarized light and the other B13 and B14 of p-polarized light. The composite light beam passes through the quarter-wave plate 828 and the beam expander 829 and enters the light deflector unit 804. The quarter-wave plate 828 converts the the components of the composite light beam to clockwise circularly polarized light and counterclockwise circularly polarized light, and the beam expander 829 expands the composite light beam CB4 to have a relatively large diameter.

The light beam output unit 806 therefore emits the composite light beam CB4 consisting of two sub-composite beams Ba and Bb: the first sub-composite beam Ba includes the components B11 and B12 of clockwise circularly polarized light each having a wavelength of 488 nm and 514.5 nm respectively, and the second sub-composite beam Bb includes the components B13 and B14 of counterclockwise circularly polarized light each having a wavelength of 488 nm and 514.5 nm respectively. The principal rays of the sub-composite beams Ba and Bb coincide with each other.

The composite light beam CB4 passes through a focusing lens 832 disposed before the light deflector unit 804 so as to focus the each beam components on the photosensitive material 831.

The light deflector unit 804 functions as means for splitting a composite light beam. The light deflector unit 804 has a similar structure to that of the deflector unit 200 in FIG. 2, in which a prism 835 is added opposite to the quarter-wave plate 206 across the polarization beam splitter 203.

In the light deflector unit 804, the first sub-composite beam Ba of clockwise circularly polarized light runs through the first quarter-wave plate 202, the polarization beam splitter 203, the second quarter-wave plate 204, the first mirror 205 to be reflected, and the second quarter-wave plate 204 again; and then goes into the polarization beam splitter 203 to be reflected in z direction. Meanwhile, the second sub-composite beam Bb of counterclockwise circularly polarized light runs through the first quarter-wave plate 202, the polarization beam splitter 203, the third quarter-wave plate 206, the second mirror 207 to be reflected, and the third quarter-wave plate 206 again; and then passes through the polarization beam splitter 203 in z direction.

The second mirror 207 is inclined at a small angle as in the first embodiment. The second sub-composite beam Bb is thus emitted from the polarization beam splitter 203 in a direction shifted from z direction by twice the small angle. Namely, the sub-composite beams Ba and Bb go into the prism 835 in slightly different directions.

The prism 835 splits the components of different wavelengths in each sub-composite beams Ba and Bb, and emits four separate light beams to the photosensitive material 831.

The four light beams, which are modulated by the modulators 822 through 825, respectively, rotate about the axis of the drum 802 while moving along the axis of the drum 802 to thereby helically scan the photosensitive material 831. An image is thus recorded on the photosensitive material 831 with the four beams.

The courses of the four light beams B11 through B14 incident on the photosensitive material 831 are maintained while the light deflector unit 804 is rotating. Accordingly, the disposition of four light spots on the photosensitive material 831 is maintained at any position about the drum 802. This allows image recording with four different light beams.

Although the laser source 810 emits multi-colored light beams having two components of different wavelengths, laser sources emitting more than three components of different wavelengths are applicable. The laser source 810 can be replaced by plural lasers for emitting light beams of different wavelengths. Such structure allows image recording with five or more different light beams.

Figure 21:
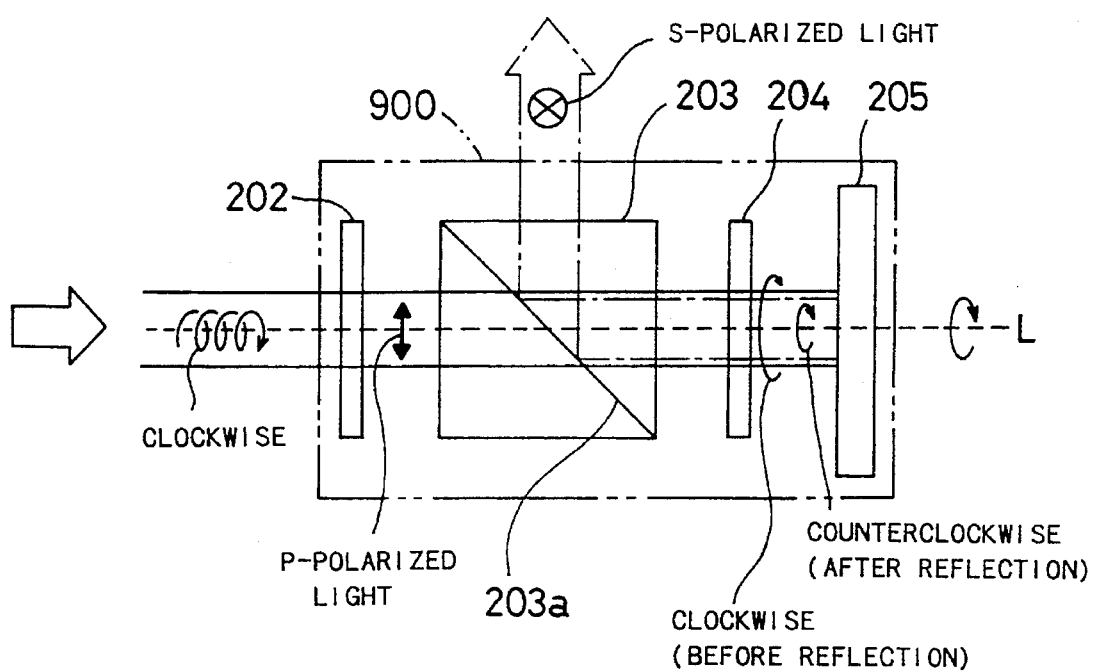
FIG. 21 is a schematic view showing a structure of a light deflector usable for one beam scanning.

Incidentally, a light deflector used for the above image recording apparatus can be modified to be suitable for deflecting a single light beam. FIG. 21 is a schematic view showing a light deflector for deflecting single light beam.

A light deflector unit 900 has a similar structure to that of the light deflector unit 200 of FIG. 2, in which the third quarter-wave plate 206 and the second mirror 207 are omitted. The light deflector unit 900 is integrally rotated around the axis L, or around the principal ray of the light beam.

An incident light beam of clockwise circularly polarized light is finally emitted upward as shown in FIG. 21 as follows:

The clockwise circularly polarized light beam is first converted to a p-polarized light beam parallel to the plane of incidence, and totally passes through the polarization beam splitter 203 to go into the second quarter-wave plate 204. The second quarter-wave plate 204 converts the p-polarized light to a clockwise circularly polarized light beam, which is inverted in direction by the mirror 205. Namely, the clockwise circularly polarized light beam is inverted to the counterclockwise light beam by reflection of the mirror 205 (see FIG. 21). The light beam then re-enters the second quarter-wave plate 204 to be converted to an s-polarized light beam and proceeds to the polarization beam splitter 203. The polarization beam splitter 203 reflects the s-polarized light beam to change the course thereof by ninety degrees and emits the light beam upward.

Since the light beam is reflected twice in the deflector unit 900, at the mirror 205 and the beam splitter 203, the direction of emission of the light beam is independent of wobble of the light deflector unit 900 around an axis perpendicular to the sheet of FIG. 21.

Figure 22:
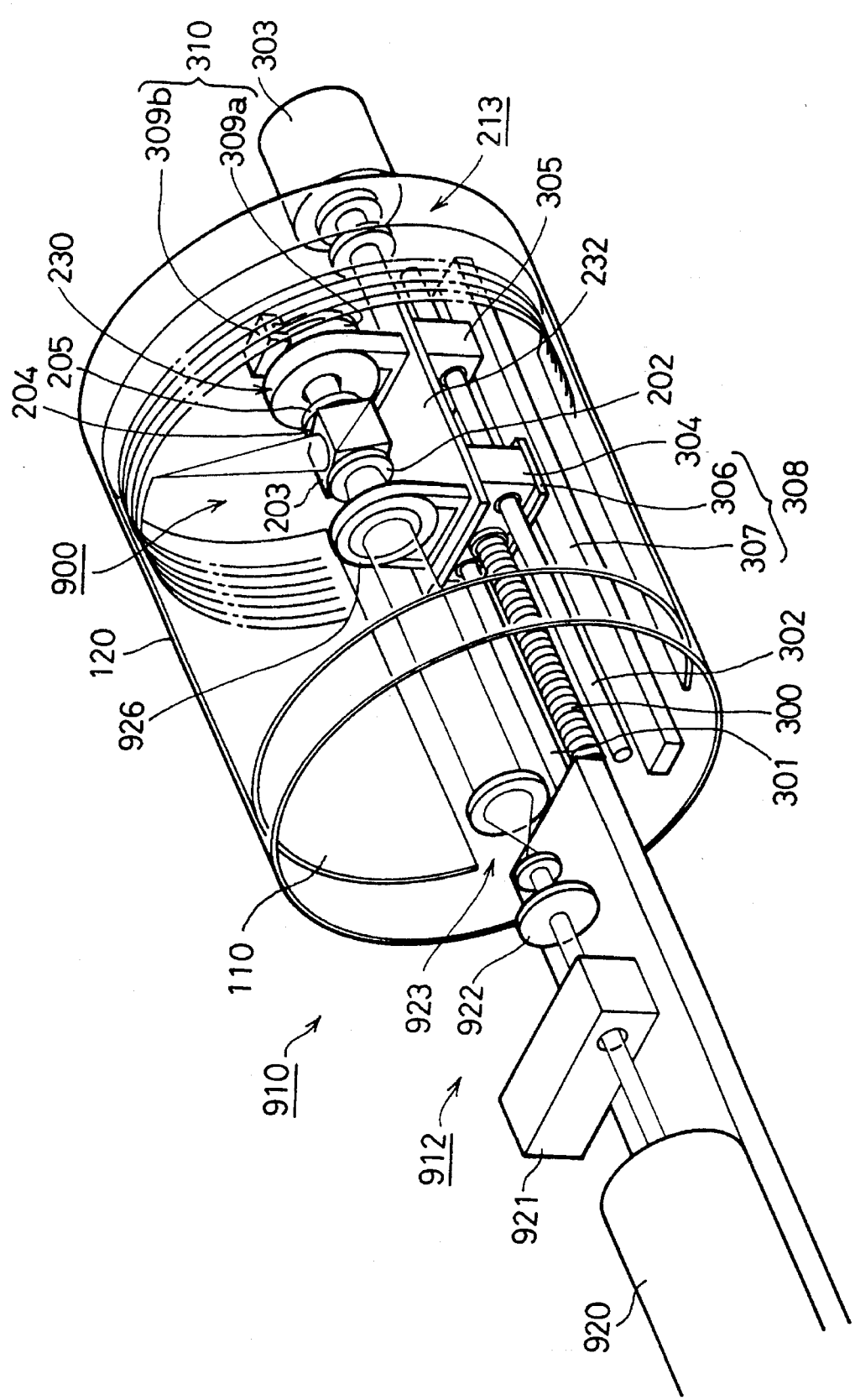
FIG. 22 is a perspective view illustrating a drum-inner-face scanning image recording apparatus with the light deflector of FIG. 21.
Figure 23:
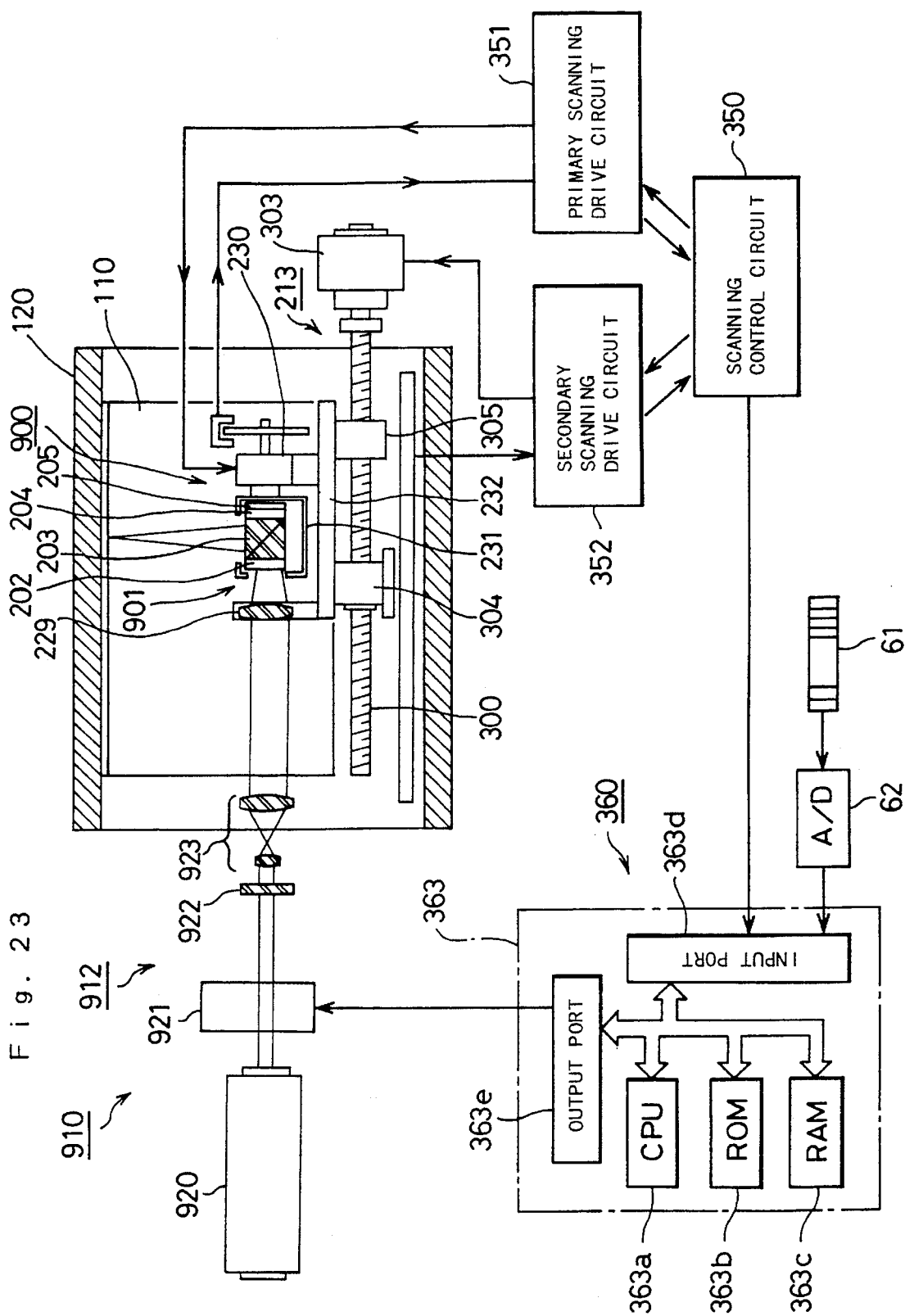
FIG. 23 is a block diagram illustrating the electrical structure of the drum-inner-face scanning image recording apparatus of FIG. 22.

FIG. 22 is a perspective view showing an image recording apparatus 910 including the light deflector unit 900 of FIG. 21; and FIG. 23 is a block diagram illustrating the electrical structure of the image recording apparatus of FIG. 22.

The image recording apparatus 910 has the same structure as the image recording apparatus 100 of FIG. 2 except a light beam output unit 912 and the light deflector unit 900.

The light beam output unit 912 includes a laser source 920, a modulator 921, a quarter-wave plate 922, and a beam expander 923, and outputs single light beam. The incident light beam goes into a focusing lens 229 and further to the light deflector unit 900.

Since the first quarter-wave plate 202 is rotated together with the polarization beam splitter 203 around the principal ray of the incident light beam, the polarization direction of the light beam emitted from the deflector unit 900 is maintained irrespective of rotational direction of the deflector unit 900. The light deflector unit 900 is favorably applicable to optical devices utilizing a light beam of particular polarization characteristics.

Incidentally, a conventional drum-inner-face scanning image recording apparatus including a pentagonal prism as a deflector, such as one described in U.S. Pat. No. 4,853,709, has the following problems even when it uses a single light beam. A linearly polarized light beam is converted to elliptically polarized light by the pentagonal prism. Further, the polarization characteristics are varied with the rotational angle of the pentagonal prism. The variation of the polarization characteristics may cause insufficient or inaccurate exposure of a highly photosensitive material. Accordingly, the pentagonal prism or other deflectors cannot be applied to optical devices utilizing a light beam of particular polarization characteristics. The light deflector unit 900 of FIG. 21 effectively solves such problems.

Since all the elements of the light deflector unit 900 are aligned along the axis L, its moment of inertia about the axis L is maintained relatively small. Hence the light deflector unit 900 is especially preferable for image recording apparatus in which the light deflector is rotated at a high speed.

Figure 24:
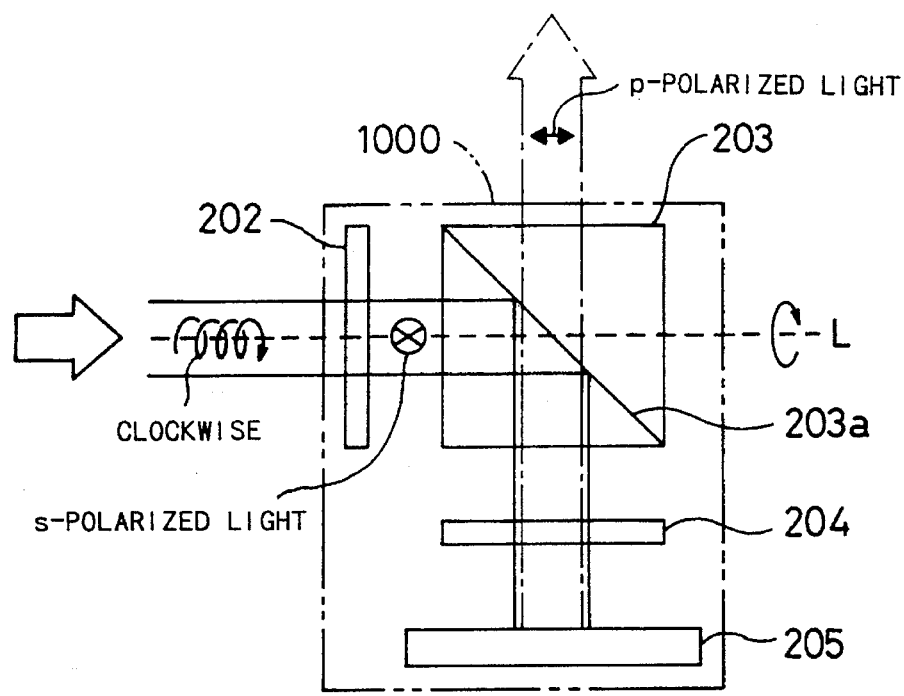
FIG. 24 is a schematic view showing another light deflector usable for one beam scanning.

FIG. 24 is a schematic view showing another light deflector for single light beam.

A light deflector unit 1000 has the same structure as the light deflector unit 900 of FIG. 21 except the orientation of the first quarter-wave plate 202 and the positions of the second quarter-wave plate 204 and the mirror 205. The second quarter-wave plate 204 and the mirror 205 are disposed in this order in a direction perpendicular to the course of an incident light beam. The phase advance axis of the first quarter-wave plate 202 is oriented in such a manner that a clockwise circularly polarized light beam is converted to s-polarized light perpendicular to the plane of incidence.

This s-polarized light beam is then reflected by a polarizer plane 203a of the polarization beam splitter 203 towards the second quarter-wave plate 204 (downward in FIG. 24). The light beam is then converted to a circularly polarized light beam by the second quarter-wave plate 204 and reflected by the mirror 205 to be rotated inversely and proceed upward in FIG. 24. The light beam re-enters the second quarter-wave plate 204 to be converted to a p-polarized light beam, and passes through the polarization beam splitter 203.

The polarization characteristics are unchanged irrespective of the rotational angle of the light deflector unit 1000 as the light deflector 900 of FIG. 21.

Figure 25:
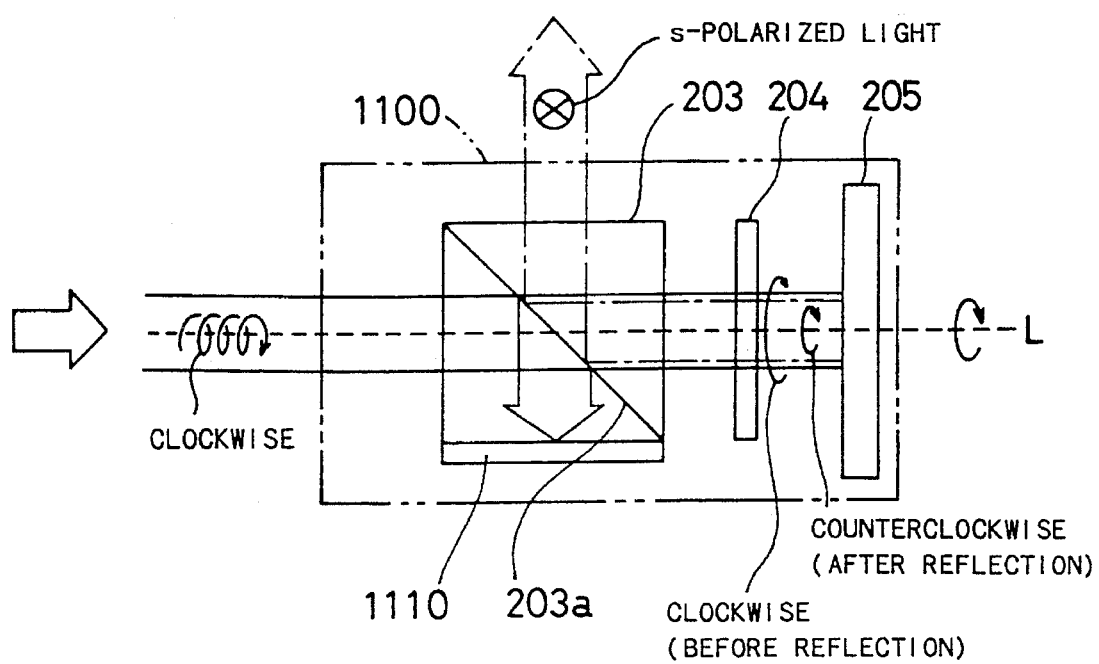
FIG. 25 is a schematic view showing still another light deflector usable for one beam scanning.

FIG. 25 is a schematic view illustrating another light deflector unit 1100 for single light beam. The light deflector unit 1100 has the same structure as the light deflector unit 900 of FIG. 21 except the following points: the first quarter-wave plate 202 is omitted and a light absorber 1110 is attached to one face of the polarization beam splitter 203.

In this deflector unit 1100, p-polarized light component of the incident circularly polarized light passes through the polarizer plane 203a, and s-polarized light component is reflected by the polarizer plane 203a downward in FIG. 25. The downward light is absorbed by the light absorber 1110. Since approximately half the quantity of the incident light beam is absorbed by the light absorber 1110 and not used in exposure, it is preferable to increase the luminance of the incident light beam accordingly.

Incidentally, polarization beam splitters in the above embodiments can be implemented by Glan-Thompson prism and Glan-Taylor prism, for example.

Figure 26:
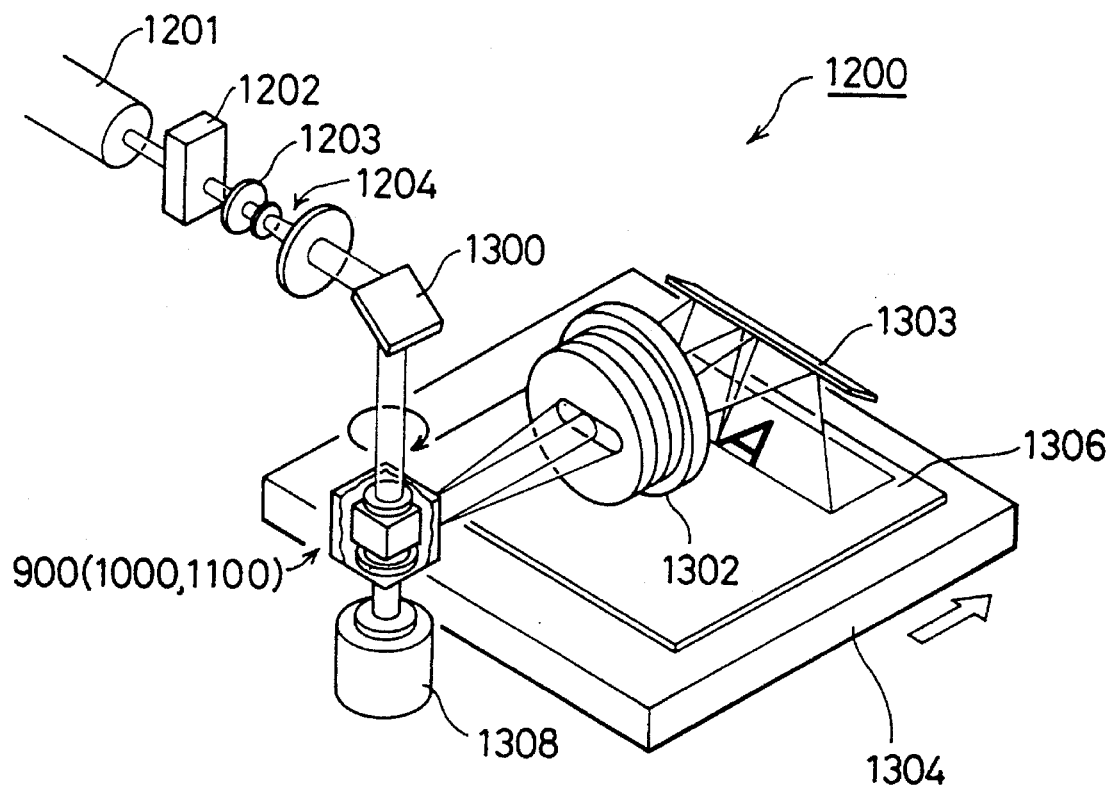
FIG. 26 is a perspective view illustrating a plane scanning image recording apparatus using the light deflector for one beam scanning.

The light deflector units 900, 1000, and 1100 are also applicable to an image recording apparatus of a flat-bed type. FIG. 26 is a perspective view illustrating such an image recording apparatus 1200 including the deflector unit 900.

In this apparatus 1200, a light beam of linearly polarized light is emitted from a laser source 1201, modulated by a modulator 1202, expanded by a beam expander 1203, and converted to a circularly polarized light beam. The expanded light beam is then reflected by a mirror 1300 and goes into the light deflector unit 900.

The light beam emitted from the light deflector unit 900 goes through an fθ lens 1302 to be focused on a photosensitive material 1306 after reflection at a mirror 1303. The light deflector unit 900 is rotated around the principal ray of the incident light beam at a constant speed by a scanning motor 1308, and thus scans and exposes the plane photosensitive material 1306.

The adverse effects of wobble is eliminated by the light deflector unit 900 such that the emission light beam is shifted only horizontally due to wobble of the light deflector unit 900. The parallel shift of the light beam does not cause any effect on the focus of the fθ lens 1302, and hence the light beam is duly focused on the photosensitive material 1306. Therefore the apparatus 1200 evenly exposes the photosensitive material 1306 along the linear scanning lines, thus allowing highly accurate image recording.

Figure 27:
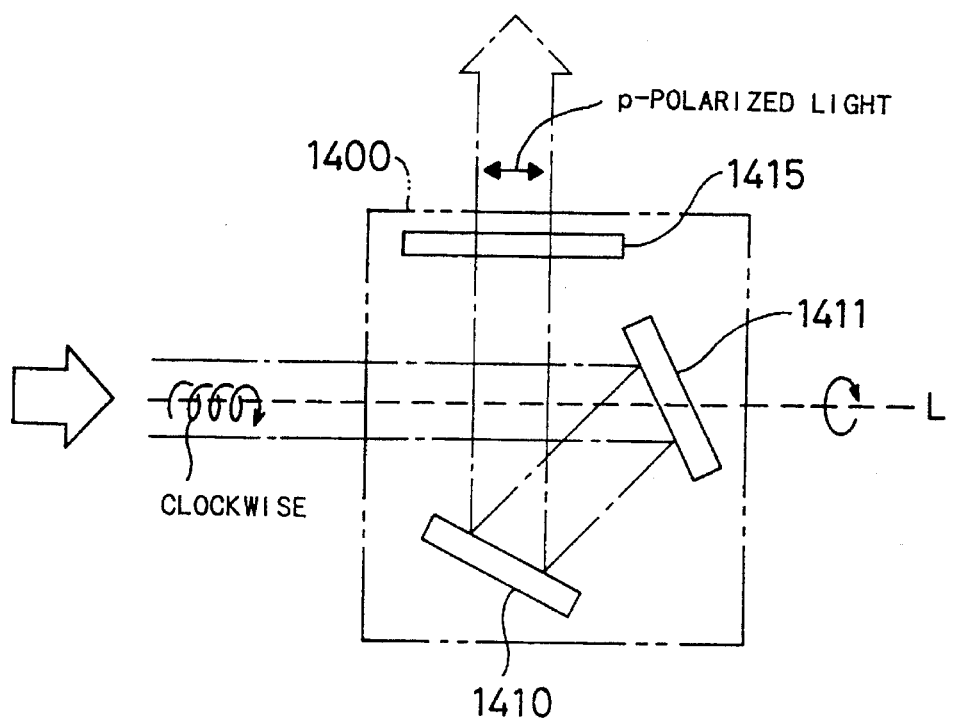
FIG. 27 is a schematic view illustrating another light deflector usable for one beam scanning.

FIG. 27 is a schematic view illustrating another light deflector unit 1400 for single light beam. The light deflector unit 1400 includes two mirrors 1410 and 1411 facing each other at a predetermined angle, and a quarter-wave plate 1415. The light deflector unit 1400 is integrally rotated around the principal ray of the incident light beam by a motor (not shown). The reflection surfaces of the mirror 1410 and 1411 are covered with a dielectric multi-layered film, which maintains variation of polarization characteristics by reflection negligibly small.

In the light deflector unit 1400, an incident light beam of circularly polarized light is first reflected by the first reflector 1411 and by the second reflector 1410 to proceed upward. The circularly polarized light beam then passes through the quarter-wave plate 1415 and converted therein to a linearly polarized light beam.

The light deflector unit 1400 efficiently eliminates the adverse effects of wobble as the light deflector units described before. Further, the linearly polarized light beam emitted from the quarter-wave plate 1415 has a fixed plane of polarization, and the polarization characteristics of the emitted light beam are unchanged irrespective of the rotational angle of the light deflector unit 1400.

Although the quarter-wave plate 1415 is disposed at the image side of the mirrors 1410 and 1411 in FIG. 27, it can be disposed before the mirrors 1410 and 1411 or between the mirrors 1410 and 1411. In any case, the light deflector unit 1400 has the same effects as the embodiment of FIG. 23, as long as the incident light beam is circularly polarized light and the quarter-wave plate 1415 is rotated together with the reflectors 1410, 1411 around the axis L. Alternatively, a polarizer plate, which transmits only one linearly polarized light component of the circularly polarized light beam, can be used in place of the quarter-wave plate 1415. In the latter case, the other linearly polarized light component is absorbed by the polarizer plate, and it is preferably to increase the luminance of the incident light accordingly.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light deflector comprising:

means for receiving a composite light beam including two circularly polarized light components having opposite handedness, said receiving means comprising converting means for converting said two circularly polarized light components to first and second linearly polarized components of first and second polarization directions perpendicular to each other; and splitting means for splitting said first and second linearly polarized light components to form a predetermined angle, and for separately deflecting said first and second light components, wherein said splitting means comprises:

a polarization beam splitter which selectively transmits said first linearly polarized component of said first polarization direction and deflects said second linearly polarized light component of said second polarization direction;

a first quarter-wave plate and a first reflector disposed in that order after said polarization beam splitter such that light of said first polarization direction passes through said first quarter-wave plate to be reflected by said first reflector back through said first quarter-wave plate, re-enters said polarization beam splitter as linearly polarized light of said second polarization direction so as to be deflected by said polarization beam splitter, and propagates out of said polarization beam splitter in a first exit direction; and a second quarter-wave plate and a second reflector disposed in that order after said polarization beam splitter such that light of said second polarization direction passes through said second quarter-wave to be reflected by said second reflector back through said second quarter-wave plate, re-enters said polarization beam splitter as linearly polarized light of said first polarization direction so as to pass through said polarization beam splitter, and propagates out of said polarization beam splitter in a second exit direction, wherein said first and second exit directions are non-parallel.

2. A light deflector in accordance with claim 1, wherein:

at least one of said first and second reflectors is inclined to have a non-zero reflection angle.

3. A light deflector in accordance with claim 1, wherein said two circularly polarized light components included in said composite light beam have a common principal ray.

4. A light deflector in accordance with claim 3, said light deflector having an axis of rotation which is coincident with said principal ray of said composite light beam.

5. A light deflector in accordance with claim 4, wherein said first reflector reflects said first polarized light component of said first polarization direction an odd number of times to make said first polarized light component re-enter said polarization beam splitter, and said second reflector reflects said second polarized light component of said second polarization direction an odd number of times to make said second polarized light component re-enter said polarization beam splitter.

6. A light deflector in accordance with claim 5, wherein said converting means is a quarter-wave plate having a phase advance axis set at 45 degrees with respect to both said first polarization direction of said first linearly polarized light component and said second polarization direction of said second linearly polarized light component.

7. A light deflector comprising:

means for receiving a composite light beam including two circularly polarized light components having opposite handedness, said receiving means comprising converting means for converting said two circularly polarized light components to first and second linearly polarized components of first and second polarization directions perpendicular to each other, said converting means comprising a wave plate for converting said first and second circularly polarized light components into said first and second linearly polarized light components, respectively; and means for splitting said first and second linearly polarized light components to form a predetermined angle, and for separately deflecting said first and second light components, wherein said first and second light components propagate out of said splitting means in a first exit direction and a second, different, exit direction, respectively.

said splitting means comprising:

a polarization beam splitter which transmits said first linearly polarized light component and deflects said second linearly polarized light component;

a first quarter-wave plate and a first reflector disposed in that order after said polarization beam splitter for converting said first linearly polarized light component into a first converted linearly polarized light component having said second polarization direction, wherein said first quarter-wave plate and said first reflector cause said first converted linearly polarized light component to re-enter said polarization beam splitter; and a second quarter-wave plate and a second reflector disposed in that order after said polarization beam splitter for converting said second linearly polarized light component into a second converted linearly polarized light component having said first polarization direction, wherein said second quarter-wave plate and said second reflector cause said second converted linearly polarized light component to re-enter said polarization beam splitter;

wherein said first reflector reflects said first polarized light component of said first polarization direction an odd number of times to make said first polarized light component re-enter said polarization beam splitter, and said second reflector reflects said second polarized light component of said second polarization direction an odd number of times to make said second polarized light component re-enter said polarization beam splitter.

* * * * *

UNITED STATES PATENT AND TRADEMARK OFFICE
CERTIFICATE OF CORRECTION

PATENT NO. : 5,504,619
DATED : April 2, 1996
INVENTOR(S) : Masahide Okazaki

It is certified that error appears in the above-indentified patent and that said Letters Patent is hereby corrected as shown below:

<u>Column 19, line 29</u>, "wherein" should read --wherein a wave plate associated with--.

Signed and Sealed this

Twenty-fourth Day of December, 1996

Attest:

BRUCE LEHMAN

*Attesting Officer*     *Commissioner of Patents and Trademarks*